(12) United States Patent
Chaudhary et al.

(10) Patent No.: US 11,981,798 B2
(45) Date of Patent: May 14, 2024

(54) RAPIDLY MOISTURE-CURABLE POLYETHYLENE FORMULATION

(71) Applicant: Dow Global Technologies LLC, Midland, MI (US)

(72) Inventors: Bharat I. Chaudhary, Collegeville, PA (US); Sarat Munjal, Lake Jackson, TX (US); Rajesh P. Paradkar, Lake Jackson, TX (US); Arkady L. Krasovskiy, Lake Jackson, TX (US); Manish Talreja, Collegeville, PA (US); Manish K. Mundra, Collegeville, PA (US); Kevin P. Rogers, Jameson, PA (US); Bruce M. Hasch, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 84 days.

(21) Appl. No.: 17/442,991

(22) PCT Filed: Feb. 11, 2020

(86) PCT No.: PCT/US2020/017654
§ 371 (c)(1),
(2) Date: Sep. 24, 2021

(87) PCT Pub. No.: WO2020/197654
PCT Pub. Date: Oct. 1, 2020

(65) Prior Publication Data
US 2022/0153973 A1   May 19, 2022

Related U.S. Application Data

(60) Provisional application No. 62/823,889, filed on Mar. 26, 2019.

(51) Int. Cl.
| | | |
|---|---|---|
| *C08L 23/00* | (2006.01) | |
| *C08J 3/24* | (2006.01) | |
| *C08K 5/14* | (2006.01) | |
| *C08K 5/57* | (2006.01) | |
| *C08L 23/08* | (2006.01) | |

(52) U.S. Cl.
CPC ............ *C08L 23/0892* (2013.01); *C08J 3/24* (2013.01); *C08K 5/14* (2013.01); *C08K 5/57* (2013.01); *C08L 2203/202* (2013.01); *C08L 2207/066* (2013.01)

(58) Field of Classification Search
CPC . C08F 210/02; C08F 230/085; C08L 23/0892
See application file for complete search history.

(56) References Cited

U.S. PATENT DOCUMENTS

| | | | |
|---|---|---|---|
| 3,646,155 A | 2/1972 | Scott et al. | |
| 4,297,310 A | 10/1981 | Akutsu et al. | |
| 4,413,066 A | 11/1983 | Isaka et al. | |
| 4,446,283 A | 5/1984 | Dio et al. | |
| 4,689,369 A | 8/1987 | Ishino et al. | |
| 4,983,675 A | 7/1991 | Ishino et al. | |
| 5,312,861 A | 5/1994 | Meverden et al. | |
| 7,834,115 B2 | 11/2010 | Johansson et al. | |
| 8,722,827 B2 | 5/2014 | Carlsson et al. | |
| 9,133,331 B2 | 9/2015 | Dahlen et al. | |
| 9,221,934 B2 | 12/2015 | Feichtner et al. | |
| 2003/0096904 A1 | 5/2003 | Hakuta et al. | |
| 2014/0127505 A1 | 5/2014 | Dahlen et al. | |
| 2016/0251535 A1 | 9/2016 | Chaudhary | |
| 2017/0121514 A1* | 5/2017 | Chaudhary | ............ C08L 27/06 |
| 2017/0240672 A1* | 8/2017 | Costa | .................. H01L 31/0481 |

FOREIGN PATENT DOCUMENTS

| | | |
|---|---|---|
| JP | H6-41373 A | 2/1994 |
| WO | 2016/041946 A1 | 3/2016 |
| WO | 2019005439 A1 | 1/2019 |

OTHER PUBLICATIONS

International Preliminary Report on Patentability, Application No. PCT/US2020/017654 dated Sep. 28, 2021, pp. 1-7.
Ishino, Iwao et al., "Molecular Structure and Electric Breakdown of Ehtylene/Silance Copolymers", Japanese J. Appl. Physics, vol. 30, No. 4, pp. 720-726 (1991).
International Search Report and Written Opinion issued by the European Patent Office acting as International Searching Authority for International Patent Application No. PCT/US2020/017654 dated Jul. 21, 2020 (15 pages).
Communication pursuant to Article 94(3) dated Nov. 16, 2023, pertaining to EP Patent Application No. 20712089.0, 3 pgs.
Japanese Office Action dated Mar. 5, 2024, pertaining to Japanese Patent Application No. 2021-555195, 10 pgs.

* cited by examiner

*Primary Examiner* — Robert C Boyle
(74) *Attorney, Agent, or Firm* — Dinsmore & Shohl LLP

(57) ABSTRACT

A moisture-curable polyethylene formulation comprising a (hydrolyzable silyl group)-functional polyethylene copolymer and a condensation cure catalyst. The formulation is designed to be rapidly moisture curable under ambient conditions. Also methods of making and using same; cured polymer products made therefrom; and articles containing or made from same.

6 Claims, No Drawings

RAPIDLY MOISTURE-CURABLE POLYETHYLENE FORMULATION

CROSS REFERENCE TO RELATED APPLICATIONS

This application is a National Stage Entry under 35 U.S.C. § 371 of International Patent Application No. PCT/US2020/017654, filed Feb. 11, 2020, which claims priority to U.S. Provisional Patent Application Ser. No. 62/823,889 filed on Mar. 26, 2019, the entire disclosure of which is hereby incorporated by reference.

INTRODUCTION

Moisture-curable polyethylene formulations and related aspects.

Patents and patent application publications in or about the field include U.S. Pat. Nos. 4,297,310, 4,413,066, 4,446,283, 4,689,369, 4,983,675, 7,834,115B2, 8,722,827B2, 9,133,331B2, 9,221,934B2, and US20140127505A1.

U.S. Pat. No. 4,689,369 and Iwao Ishino et al., *Molecular Structure and Electric Breakdown of Ethylene/Silane Copolymers* (Japanese J. Appl. Physics, 1991, vol. 30, no. 4, pp. 720-726) report formulations containing 0.05 weight percent dibutyltin dilaurate and curing by immersing the formulations in water at 80 degrees Celsius.

SUMMARY

We discovered a moisture-curable polyethylene formulation comprising a (hydrolyzable silyl group)-functional polyethylene copolymer and a condensation cure catalyst. The formulation is designed to be rapidly moisture curable under ambient conditions and/or to attain a greater ultimate extent of crosslinking after curing by immersion in a hot water bath. Also discovered are methods of making and using same; cured polymer products made therefrom; and articles containing or made from same.

DETAILED DESCRIPTION

A moisture-curable polyethylene formulation ("the formulation" or "inventive formulation") comprising a (hydrolyzable silyl group)-functional polyethylene copolymer (HSG-FP Copolymer) and a condensation cure catalyst. Also, methods of making and using same; cured polymer products made therefrom; and articles containing or made from same.

The formulation is rapidly moisture curable under ambient conditions comprising an air atmosphere, ambient temperature (e.g., 20 to 40 degrees Celsius (° C.)), and ambient relative humidity (e.g., 10 to 96 percent relative humidity (% RH)). Also, the formulation is designed to attain a high extent (percent hot creep≤175%) of ultimate or maximum crosslinking after curing by immersion in a hot water bath. The greater the ultimate extent of crosslinking possible with the HSG-FP Copolymer, the lower the % hot creep or the greater the amount of a non-crosslinkable polymer or a non-moisture curable polymer (e.g., peroxide and/or light curable only) (e.g., polymers other than the HSG-FP Copolymer, such as polyolefins, styrenic polymers, and rubbers) that may be incorporated into the formulation without preventing the moisture cured polymer product achieving satisfactory hot creep performance for wire and cable applications of less than or equal to 175% after curing. The faster a hot creep of 175% or less is attained under ambient conditions, the higher the throughput of a manufacturing operation using the formulation to make a moisture-cured coating layer on the cable. The percent hot creep of the cured polymer product may be from 5%, 10%, 15%, or 20% to 175%, alternatively from 50% to 175%, alternatively from 100% to 175%, alternatively from 150% to 175%. These features are achieved by virtue of a combination of enabling features of the HSG-FP Copolymer and enabling features of the formulation. The enabling features of the HSG-FP Copolymer comprise the HSG-FP Copolymer's composition, which is derived from the process of making the HSG-FP Copolymer (effective process described later); the HSG-FP Copolymer's hydrolyzable silyl group content, which is derived from the molar ratio of the ethylene monomer to alkenyl-functional hydrolyzable silane comonomer in the HSG-FP Copolymer (alternatively the molar ratio thereof used in the process of making); and the HSG-FP Copolymer's molecular mass dispersity, which is derived from certain process of making conditions, such as reactor temperature and pressure and relative amounts of materials in the reactor. The enabling features of the formulation comprise the concentrations of the HSG-FP Copolymer and condensation cure catalyst therein. These amounts are chosen independently to meet or exceed minimum concentrations for enabling the rapid moisture curing under the ambient conditions and the greater ultimate crosslinking in the cured polymer product.

Some embodiments are numbered for ease of reference.

Aspect 1. A moisture-curable polyethylene formulation comprising from 15.00 to 99.99 weight percent (wt %) of (A) a (hydrolyzable silyl group)-functional polyethylene copolymer (HSG-FP Copolymer); from 0.1 to 5 wt %, alternatively from 0.010 to 5.0 wt % of (B) a condensation cure catalyst; and a total of from 0 to 84.99 wt % of a one or more optional additives; with the proviso that when (B) is only a dialkyltin dicarboxylate (i.e., when (B) is free of catalysts that are not tin-based), the dialkyltin dicarboxylate is at least 0.10 wt % and the (A) HSG-FP Copolymer is at most 99.90 wt % of the moisture-curable polyethylene formulation; wherein all wt % are based on total weight and add to 100.00 wt % of the moisture-curable polyethylene formulation; and wherein the (A) HSG-FP Copolymer is made by copolymerizing (polymerizing together) ethylene (monomer), at least one alkenyl-functional hydrolyzable silane (comonomer), optionally propylene ($H_2C=C(H)CH_3$), and optionally an olefinic comonomer, the copolymerizing being done under effective process conditions in a high-pressure-and-temperature (HPT) reactor free of a metal-containing olefin polymerization catalyst and containing one or more organic peroxides and, optionally, a chain transfer agent (CTA) that is not propylene or a ($C_4$-$C_{20}$) alpha-olefin; and wherein the (A) HSG-FP Copolymer is characterized by a total hydrolyzable silyl group content from 0.38 to 0.99 mole percent (mol %) and a molecular mass dispersity of any one of limitations (i) to (iii): (i) a ratio of absolute z-average molecular weight to absolute weight-average molecular weight ($M_{z(abs)}/M_{w(abs)}$ or absolute molecular mass dispersity) of 9.51 or greater; (ii) a ratio of absolute molecular mass dispersity to conventional molecular mass dispersity (($M_{z(abs)}/M_{w(abs)})/(M_{w(conv)}/M_{n(conv)}$)) of 1.51 or greater, wherein $M_{w(conv)}$ is conventional weight-average molecular weight and $M_{n(conv)}$ is conventional number-average molecular weight; and (iii) both (i) and (ii). The hydrolyzable silyl group content may be determined by NMR, FT-IR, or x-ray fluorescence (XRF) spectroscopy according to the XRF Test Method, described later. The molecular mass dispersity limitations (i) to (iii) may be determined by gel permeation chromatography (GPC) according to the GPC Test Method, described later. The process conditions comprise temperature, pressure, and amounts of materials in the HPT reactor. The copolymerizing is done in such a way that the (A) HSG-FP Copolymer made by the foregoing process is characterized by the composition, hydrolyzable silyl group content, and molecular mass dispersity, that in combination with the foregoing concentrations (wt %) of the (A) HSG-FP Copolymer and (B) condensation cure catalyst in the formulation, enable the rapid moisture curing of the formulation under ambient conditions. The formulation may be free of a compound that is an alkenyl-functional hydrolyzable silane and/or a compound that contains grafted hydrolyzable silyl groups.

The composition of the (A) HSG-FP Copolymer made by the foregoing process is characterized by constituent units selected from ethylenic units, alkylene-hydrolyzable silyl group units, optionally propylenic units, and optionally comonomeric units derived from the optional olefinic comonomer. The copolymerizing may be free of the optional olefinic comonomer and the (A) HSG-FP Copolymer may be free of comonomeric units derived from the optional olefinic comonomer. Alternatively, the copolymerizing may comprise the olefinic comonomer and the (A) HSG-FP Copolymer may comprise comonomeric units derived from the olefinic comonomer. The olefinic comonomer may be selected from a $(C_4-C_{20})$alpha-olefin, an olefinically-unsaturated carboxylic acid, an olefinically-unsaturated carboxylic ester, an olefinically-unsaturated carboxylic anhydride, and combinations thereof. The carboxylic acid may be monocarboxylic or dicarboxylic. The carboxylic ester may be monocarboxylic ester, dicarboxylic monoacid monoester, or dicarboxylic diester. The olefinically-unsaturated carboxylic acid may be a terminally unsaturated $(C_2-C_8)$carboxylic acid, alternatively a (meth)acrylic acid, alternatively an unsaturated dicarboxylic acid. The olefinically-unsaturated carboxylic ester may be a vinyl $(C_2-C_8)$carboxylate ester, alternatively a vinyl $(C2-C_5)$carboxylate ester (e.g., vinyl acetate, vinyl propionate, or vinyl butanoate), alternatively a $(C_1-C_8)$alkyl (meth)acrylate ester, alternatively a $(C_1-C_3)$ alkyl (meth)acrylate ester, alternatively a di$(C_1-C_8)$alkyl diester of an unsaturated dicarboxylic acid, alternatively a mono$(C_1-C_8)$alkyl ester of an unsaturated dicarboxylic acid, alternatively a mono$(C_1-C_8)$alkyl ester of maleic acid. The (meth)acrylate means $H_2C=CHCO_2$— or $H_2C=C(CH_3)CO_2$—. The CTA may be acetone, methyl ethyl ketone, propionaldehyde, 2-propanol, ethyl acetate, isobutene, butane, 2-methylpropane, ISOPAR™-C, ISOPAR™-E, ISOPAR™-H, or a combination of any two or more thereof. The CTA, when present, may be from 0.03 to 10 wt % of the polymerization reaction mixture.

Aspect 2. The moisture-curable polyethylene formulation of aspect 1 characterized by any one of limitations (i) to (xii): (i) the HPT reactor and process of making the (A) HSG-FP Copolymer is free of propylene and the (A) HSG-FP Copolymer is free of (has 0 wt %) propylenic units derived from propylene, (ii) the HPT reactor and process of making the (A) HSG-FP Copolymer comprises from greater than 0 wt % to at most 2 wt % of propylene, based on total mass flow rates of ethylene, the at least one alkenyl-functional hydrolyzable silane, and propylene (functioning as a chain transfer agent and/or a molecular weight control agent) into the HPT reactor and the (A) HSG-FP Copolymer comprises from >0 wt % to at most 2 wt % of propylenic units derived from propylene, (iii) the HPT reactor and process of making the (A) HSG-FP Copolymer is free of $(C_4-C_{20})$alpha-olefin and the (A) HSG-FP Copolymer is free of (0 wt %) units derived from the $(C_4-C_{20})$alpha-olefin, (iv) the HPT reactor and process of making the (A) HSG-FP Copolymer comprises from >0 wt % to at most 20 wt % of $(C_4-C_{20})$alpha-olefin (e.g., a $(C_4-C_8)$alpha-olefin), based on total mass flow rates of ethylene, the at least one alkenyl-functional hydrolyzable silane, and $(C_4-C_{20})$alpha-olefin (e.g., a $(C_4-C_8)$alpha-olefin) and the (A) HSG-FP Copolymer comprises from >0 wt % to at most 20 wt % comonomeric units derived from the $(C_4-C_{20})$alpha-olefin (e.g., a $(C_4-C_8)$alpha-olefin), (v) both (i) and (iii), (vi) both (i) and (iv), (vii) both (ii) and (iii), (viii) both (ii) and (iv), (ix) the (A) HSG-FP Copolymer is free of grafted hydrolyzable silyl groups (free of groups bonded into (A) in a post-polymerization reactor grafting process) and the moisture-curable polyethylene formulation is free of alkenyl-functional hydrolyzable silane (unreacted), (x) both (ix) and any one of limitations (i) to (viii), (xi) the effective process conditions comprise a reactor temperature from 175° to 400.0° C. (e.g., from 180.0° to 320° C., alternatively from 200° to 300° C., alternatively from 245° to 255° C., e.g., 250° C.±1° C.) and a reactor pressure from 34.5 to 344.7 megapascals (MPa) (e.g., from 110 to 310 MPa, alternatively from 150 to 250 MPa, alternatively from 185 to 195 MPa, e.g., 193 MPa±1.0 MPa), or (xii) both (xi) and any one of limitations (i) to (x).

Aspect 3. The moisture-curable polyethylene formulation of aspect 1 or 2 wherein the (A) HSG-FP Copolymer is characterized by a total hydrolyzable silyl group content of from 0.43 to 0.99 mol %, alternatively from 0.48 to 0.99 mol %, alternatively from 0.53 to 0.99 mol %, alternatively from 0.58 to 0.99 mol %, alternatively from 0.63 to 0.99 mol %, alternatively from 0.68 to 0.99 mol %, alternatively from 0.73 to 0.99 mol %, alternatively from 0.78 to 0.99 mol %, alternatively from 0.83 to 0.99 mol %, alternatively from 0.83 to 0.99 mol %, alternatively from 0.38 to 0.93 mol %, alternatively from 0.38 to 0.88 mol %, alternatively from 0.38 to 0.83 mol %, alternatively from 0.38 to 0.78 mol %, alternatively from 0.38 to 0.73 mol %, alternatively from 0.38 to 0.68 mol %, alternatively from 0.38 to 0.63 mol %, alternatively from 0.38 to 0.58 mol %, alternatively from 0.38 to 0.53 mol %, alternatively from 0.38 to 0.48 mol %. The total mol % of hydrolyzable silyl group content is calculated from wt % values of hydrolyzable silyl group content(s), wherein the wt % values are determined according to the X-Ray Fluorescence (XRF) Test Method, described later. For example, when the at least one alkenyl-functional hydrolyzable silane is vinyltrimethoxysilane (VTMS), its molecular weight is 148.23 g/mol, and at a comonomeric content is 2.0 wt %, the mol %=0.38 mol %. When VTMS comonomeric content is 5.0 wt %, the mol %=0.99 mol %. The mol % hydrolyzable silyl group content at any given wt % hydrolyzable silyl group content value will vary inversely with the molecular weight of the at least one alkenyl-functional hydrolyzable silane from which the hydrolyzable silyl groups are derived.

Aspect 4. The moisture-curable polyethylene formulation of any one of aspects 1 to 3 wherein the (A) HSG-FP Copolymer is characterized by a molecular mass dispersity of any one of limitations (i) to (v): (i) a ratio of $M_{z(abs)}/M_{w(abs)}$ of 10.5 to 21.0, alternatively 12.0 to 20.4, alternatively 14.0 to 20.0, alternatively 16.0 to 19.0, alternatively 16.2 to 18.9; (ii) a ratio of $(M_{z(abs)}/M_{w(abs)})/(M_{w(conv)}/M_{n(conv)})$ of 1.9 to 3.4, alternatively 2.0 to 3.3, alternatively 2.3 to 3.1; and (iii) both a ratio of $M_{z(abs)}/M_{w(abs)}$ of 10.5 to 21.0, alternatively 12.0 to 20.4, alternatively 14.0 to 20.0, alternatively 16.0 to 19.0, alternatively 16.2 to 18.9; and a ratio of $(M_{z(abs)}/M_{w(abs)})/(M_{w(conv)}/M_{n(conv)})$ of 1.9 to 3.4; (iv) both a ratio of $M_{z(abs)}/M_{w(abs)}$ of 10.5 to 21.0; and a ratio of $(M_{z(abs)}/M_{w(abs)})/(M_{w(conv)}/M_{n(conv)})$ of 1.9 to 3.4, alternatively 2.0 to 3.3, alternatively 2.3 to 3.1; (v) a ratio of $M_{z(abs)}/M_{w(abs)}$ of 16.2 to 18.9 and a ratio of $(M_{z(abs)}/M_{w(abs)})/(M_{w(conv)}/M_{n(conv)})$ of 2.3 to 3.1.

Aspect 5. The moisture-curable polyethylene formulation of any one of aspects 1 to 4 wherein each hydrolyzable silyl group of the (A) HSG-FP Copolymer is independently a monovalent group of formula $(R^2)_m(R^3)_{3-m}Si—$, wherein subscript m is an integer of 1, 2, or 3; each $R^2$ is independently H, HO—, $(C_1-C_8)$alkoxy, $(C_2-C_6)$carboxy, phenoxy, $(C_1-C_6)$alkyl-phenoxy, $(C_1-C_6)$alkyl(H)N—, $((C_1-C_6)$alkyl$)_2$ N—, $(C_1-C_6)$alkyl(H)C=NO—, or $((C_1-C_6)$alkyl$)_2$ C=NO—; and each $R^3$ is independently $(C_1-C_8)$alkyl or phenyl. Each $R^2$ may be free of H and HO—, alternatively free of phenoxy and $(C_1-C_6)$alkyl-phenoxy. Each $R^2$ may be independently $(C_1-C_6)$alkoxy, $(C_2-C_6)$carboxy, $((C_1-C_6)$alkyl$)_2$N—, $(C_1-C_6)$alkyl(H)C=NO—, or $((C_1-C_6)$alkyl$)_2$ C=NO—; alternatively $(C_1-C_6)$alkoxy; alternatively $(C_2-C_6)$carboxy; alternatively $((C_1-C_6)$alkyl$)_2$N—; alternatively $(C_1-C_6)$alkyl(H)C=NO—; alternatively $((C_1-C_6)$alkyl$)_2$ C=NO—. All the hydrolyzable silyl groups of the (A) HSG-FP Copolymer may be the same. The hydrolyzable silyl groups are derived from the hydrolyzable silyl groups of the at least one alkenyl-functional hydrolyzable silane (comonomer) from which comonomeric units of the (A) HSG-FP Copolymer containing such groups are made.

Aspect 6. The moisture-curable polyethylene formulation of any one of aspects 1 to 5 wherein the (B) condensation cure catalyst is selected from any one of (i) to (iv): (i) a Brønsted acid; (ii) a Brønsted base; (iii) a Lewis acid; and (iv) a Lewis base. The (B) may be either (i) or (iii); alternatively either (ii) or (iv). The (B) may be the Lewis acid, which may be a dialkyltin dicarboxylate. The (B) may be the Brønsted acid, which may be a sulfonic acid of formula $RSO_3H$ wherein R is $(C_1-C_{10})$alkyl, $(C_6-C_{10})$aryl, a $(C_1-C_{10})$alkyl-substituted $(C_6-C_{10})$aryl, or a $(C_6-C_{10})$aryl-substituted $(C_1-C_{10})$alkyl; or a blocked sulfonic acid, which makes the sulfonic acid in situ.

Aspect 7. The moisture-curable polyethylene formulation of any one of aspects 1 to 6 comprising a total of from >0 wt % to 84.99 wt % of the one or more optional additives, wherein the additive(s) is/are selected from additives (C) to (I): (C) an antioxidant; (D) a colorant; (E) a moisture scavenger; (F) a stabilizer for stabilizing the formulation against effects of ultraviolet light (UV stabilizer), such as a hindered amine light stabilizer (HALS); (G) a processing aid; (H) a flame retardant; (I) a polymer that is not (A); and a combination of any two or more of (C) to (I). For example, the formulation may further comprise any one, alternatively any four, alternatively each of the (C) antioxidant such as pentaerythritol tetrakis(3-(3,5-bis(1,1-dimethylethyl)-4-hydroxyphenyl)propionate, (D) colorant such as carbon black and/or titanium dioxide, (E) moisture scavenger such as octyltriethoxysilane, (F) UV stabilizer such as a HALS, and (I) polymer that is not (A) such as an LLDPE.

The moisture-curable polyethylene formulation of any one of aspects 1 to 7 may comprise from 50.9 to 99.90 wt %, alternatively from 90.0 to 98 wt % of (A) HSG-FP Copolymer; from 0.10 to 1.0 wt % of (B) condensation cure catalyst; and a total of from 0 to 48.10 wt %, alternatively 1.0 to 9.0 wt % of a one or more optional additives (e.g., (C), (D), (E), (F), and/or (I)); wherein all wt % are based on total weight of the formulation. Alternatively, the formulation of any one of aspects 1 to 7 may comprise from 15.9 to 38.9 wt % of (A) HSG-FP Copolymer; from 0.10 to 1.0 wt % of (B) condensation cure catalyst; from 80.0 to 60.0 wt % of (H) flame retardant; and a total of from 1.0 to 4.0 wt % of a one or more optional additives (e.g., (C), (D), (E), (F), and/or (I)); wherein all wt % are based on total weight of the formulation. The (A) HSG-FP Copolymer may be made by copolymerizing ethylene; one or two alkenyl-functional hydrolyzable silanes, alternatively one alkenyl-functional hydrolyzable silane; and 0, 1, 2, or more of the optional comonomers. The (A) HSG-FP Copolymer may be made by copolymerizing ethylene, the at least one alkenyl-functional hydrolyzable silane (comonomer), and optionally propylene $(H_2C=C(H)CH_3)$.

Aspect 8. A moisture-curable polyethylene formulation comprising (A) a (hydrolyzable silyl group)-functional polyethylene copolymer (HSG-FP Copolymer); (B) a condensation cure catalyst; and 0, 1, or more optional additives; wherein moisture-curability of the formulation is characterized by any one of features (i) to (iv): (i) curable under ambient conditions comprising air, a temperature of 23° C.±2° C. and relative humidity of 50% RH±2% RH in less than 15 days to make a cured polymer product characterized by a percent hot creep of less than or equal to (≤) 100%; (ii) curable under ambient conditions comprising air, a temperature of 23° C.±2° C. and relative humidity of 50% RH±2% RH in less than 23 days to make a cured polymer product characterized by a percent hot creep of ≤80%; (iii) curable by immersion in hot water at 90° C.±2° C. for 20.0 hours to make a cured polymer product characterized by a percent hot creep of less than 19% when the formulation is free of a polymer that is not (A); and (iv) curable by immersion in hot water at 90° C.±2° C. for 20.0 hours to make a cured polymer product characterized by a percent hot creep of less than 50%, alternatively <30% when the formulation contains 46 wt % of a linear low-density polyethylene (LL-DPE); all as measured by the Hot Creep Test Method, described later. The moisture-curability of the formulation may be characterized by any one of feature combinations (v) to (xii): (v) both (i) and (ii); (vi) both (i) and (iii); (vii) both (i) and (iv); (viii) both (ii) and (iii); (ix) both (ii) and (iv); (x) both (iii) and (iv); (xi) any three of (i) to (iv); and (xii) each of (i) to (iv); all as measured by the Hot Creep Test Method, described later. The feature (i) may be achieved in less than 13 days, alternatively less than 10 days, alternatively less than 8 days, alternatively less than 4 days, alternatively less than 3 days, alternatively less than 2 days, alternatively less than 1 day. The feature (ii) may be achieved in less than 20 days, alternatively less than 17 days, alternatively less than 15 days, alternatively less than 13 days, alternatively less than 10 days, alternatively less than 5 days, alternatively less than 4 days, alternatively less than 3 days, alternatively less than 2 days, alternatively less than 1 day. The feature (iii) may be less than 17.5% when the formulation is free of a polymer that is not (A). The feature (iv) may be less than 30% when the formulation contains 46 wt % of the LLDPE (e.g., LLDPE (I)-1 described later). The formulation may be the moisture-curable polyethylene formulation of any one of aspects 1 to 7. The number of days to attain the 100% percent hot creep of feature (i) or lower may be at least 0.6 day, alternatively at least 1.0 day, alternatively at least 2 days. The number of days to attain the 80% percent hot creep of feature (ii) or lower may be at least 0.8 day, alternatively at least 2 days, alternatively at least 3 days. The percent hot creep of feature (iii) may be at least 7%, alternatively at least 7.6%. The percent hot creep of feature (iv) may be at least 20%, alternatively at least 22%.

Aspect 9. A method of making a cured polymer product, the method comprising moisture curing the moisture-curable polyethylene formulation of aspect 8 so as to give the cured polymer product, wherein the moisture curing is characterized by any one of the features (i) to (xii) except wherein "curable" is replaced by "curing". That is, the curing is done according to the conditions of any one of features (i) to (xii).

Aspect 10. A method of making a moisture-curable polyethylene formulation of any one of aspects 1 to 8, the method comprising mixing a melt of (A) a (hydrolyzable silyl group)-functional polyethylene copolymer with (B) a condensation cure catalyst, so as to give a melt-mixture comprising the melt of (A) and the (B) condensation cure catalyst; and extruding the melt-mixture so as to make the moisture-curable polyethylene formulation. The method may further comprise adding at least one of additives (C) to (I) to the melt of (A) or the melt-mixture of (A) and (B) so as to make the formulation of aspect 7.

Aspect 11. A cured polymer product made by moisture curing the moisture-curable polyethylene formulation of any one of aspects 1 to 8 so as to give the cured polymer product. The formulation may be moisture cured in a solid state or in a melt state thereof. The moisture curing may be performed under ambient conditions comprising an air atmosphere, ambient temperature (e.g., 20 to 40 degrees Celsius (° C.)), and ambient relative humidity (e.g., 10 to 90 percent relative humidity (% RH)). Alternatively, the moisture curing may be performed at greater than ambient conditions comprising an air atmosphere, a temperature from 41 degrees Celsius (° C.) to 95° C. and the relative humidity from 10.0 percent (% RH) to 100% RH. The cured polymer product may be an insulation layer or a semiconductive layer or an outer shielding layer of a coated conductor, described later.

Aspect 12. A manufactured article comprising a shaped form of the formulation of any one of aspects 1 to 8 or the cured polymer product of aspect 11. Examples are a coating on a substrate, a tape, a film, a layer of a laminate, a foam, and a pipe.

Aspect 13. A coated conductor comprising a conductive core and a polymeric layer at least partially surrounding the conductive core, wherein at least a portion of the polymeric layer comprises the cured polymer product of aspect 11. The entire polymeric layer may comprise the cured polymer product. The conductive core may be linear shape (e.g., like a wire) having a length and proximal and distal ends spaced apart from each other by the length of the linear shape; and the polymeric layer may surround the conductive core except for the proximal and distal ends. The coated conductor may further comprise one or more additional polymeric layers, which independently may or may not comprise the cured polymer product; and/or an outer shielding layer (e.g., a metal sheath or sleeve). The coated conductor may comprise one or two insulation layers, at least one of which comprises the cured polymer product; alternatively or additionally one or two semiconductive layers, at least one of which comprises the cured polymer product containing a carbon black; alternatively or additionally an outer shielding layer, which comprises the cured polymer product.

Aspect 14. A method of conducting electricity, the method comprising applying a voltage across the conductive core of the coated conductor of aspect 13 so as to generate a flow of electricity through the conductive core. The conductive core may have length and proximal and distal ends spaced apart by the length, and the electricity may flow the length of the conductive core from the proximal end to the distal end, or vice versa.

Too, the moisture-curable polyethylene formulation may be moisture cured at from 41° C. to less than the melting temperature of (A) (e.g., <115° C.), in a non-air (e.g., nitrogen gas) atmosphere having a relative humidity of 10% to 100% RH, or both. All other things being equal, the higher the temperature and/or the higher the % RH, the faster the moisture curing of the formulation and/or greater extent of crosslinking in the cured product.

Beneficially the moisture-curable polyethylene formulation may be rapidly moisture cured under representative ambient conditions comprising air, a temperature of 23° C. and relative humidity of 50% RH to make a cured polymer product characterized by a percent hot creep of less than or equal to (≤) 100% in less than 15 days, alternatively less than 13 days, alternatively less than 10 days, alternatively less than 8 days, alternatively less than 4 days, alternatively less than 3 days, alternatively less than 2 days, alternatively less than 1 day, all as measured by the Hot Creep Test Method, described later. A hot creep of less than 175% is desired for use of the cured polymer product as an insulation layer or semiconductive layer of a power cable, such as a low voltage (LV) power cable. Power cables may experience operating temperatures greater than ambient temperatures, which elevated temperatures demand that the power cables do not significantly sag or droop. All other things being equal, the lower the hot creep percent, the better the performance in a power cable. The formulation may be moisture cured under these representative ambient conditions to make a cured polymer product characterized by a percent hot creep of less than 80% in ≤23 days, alternatively less than 20 days, alternatively less than 17 days, alternatively less than 15 days, alternatively less than 13 days, alternatively less than 10 days, alternatively less than 5 days, alternatively less than 4 days, alternatively less than 3 days, alternatively less than 2 days, alternatively less than 1 day, all as measured by the Hot Creep Test Method, described later. To determine the number of days needed to attain hot creep of 100% or 80%, periodically measure percent hot creep of a test material being subjected to curing under ambient conditions over from 1 to 182 days, alternatively from 1 to 70 days, alternatively from 1 to 35 days. For example, % hot creep may be measured after ambient curing for 1 day, 2 days, 3 days, 4 days, 7 days, 10 days, 14 days, 21 days, 28 days, and 35 days. Then plot the measured % hot creep values on a y-axis versus time in days on x-axis. Plot the data as a line graph or best fit a line to the data. Read (or interpolate) from the line the number of days to attain hot creep of 100% and 80%.

The moisture-curable polyethylene formulation may be moisture cured by immersion in hot water at 70° to 95° C. in less than 24 hours to make a cured polymer product having an extent of ultimate (maximum) crosslinking. The extent of ultimate crosslinking of the cured polymer product may be characterized by immersing the formulation for 20 hours in a 90° C. water bath to give a cured polymer product having an ultimate crosslinking, and measuring extent thereof as percent hot creep. The percent hot creep of the cured polymer product may be less than 19%, alternatively less than 17.5% when the formulation is free of (I) polymer that is not (A) (e.g., free of LLDPE resin). The percent hot creep of the cured polymer product may be less than 50%, alternatively less than 30%, alternatively less than 25% when the formulation contains 46 wt % LLDPE.

To compare percent hot creep results of different samples of a same moisture-curable polyethylene formulation or different formulations, their moisture-cured polymer products may be configured for hot creep measurements by extruding the cured products as tapes having a thickness of 1.370 millimeters (mm, 54 mils) to 1.60 mm (63 mils), and the hot creep performance (%) of the tapes may be measured at 0.2 megapascal (MPa) and 200° C. All other things being equal, the thicker the tape, the longer it would take to achieve a specific hot creep percent value.

The total weight of all constituents, including additives, in the moisture-curable polyethylene formulation is 100.00 wt %. All other things being equal, the greater the loading (amount) of the (A) HSG-FP Copolymer in the formulation, the faster the moisture curing thereof under ambient conditions. All other things being equal, the great the loading (amount) of the (B) condensation cure catalyst in the formulation, the faster the moisture curing thereof under ambient conditions.

The moisture-curable polyethylene formulation may consist essentially of its required constituents (A) and (B) described above. The expression consist essentially of means these embodiments of the formulation may be free of added constituents selected from any one of constituents (i) to (vii): (i) a foaming agent or blowing agent such as, for example, an azodicarbonamide, (ii) a (hydrolyzable silyl group)-functional polyethylene copolymer that is not (A), (iii) a polyethylene polymer that is not a reactor polyethylene, (iv) an ethylene/ethyl acrylate (EEA) copolymer or other acrylate-containing polymer, (v) a metal carboxylate salt, wherein the metal is any metal other than tin; (vi) any four of (i) to (v); and (vii) each of (i) to (v). By "added constituents" is meant a purposely introduced ingredient. Some of the constituents (i) to (v) may be present as impurities in, or be carried over from, the synthesizing of (e.g., an olefin polymerization catalyst carried over from synthesizing the (A) HSG-FP Copolymer, or synthesizing an optional constituent described earlier (e.g., additives (C) to (I)) and thereby inadvertently introduced into the formulation. These impurities, if present, are not expected to be at level where they would have a measurable effect, beneficial or detrimental, on performance of the formulation. If the formulation is free of any one of constituents (i) to (vii), then the moisture-cured polymer product, manufactured article, and coated conductor made therefrom, and methods of making or using same, also may be free of the same any one of constituents (i) to (vii). Alternatively, the formulation may consist essentially of its constituents (A) and (B) described earlier at least one of optional additives (C) to (I).

The moisture-curable polyethylene formulation may be made according to the above method or the method exemplified later in the Examples. The formulation may be made in a continuous (monolithic) or divided solid form. The formulation may be extruded, pelletized, and/or shaped so as to give formulation as a solid (e.g., shaped or pellets).

The moisture-curable polyethylene formulation may be made as a one-part formulation, alternatively a multi-part formulation such as a two-part formulation. The two-part formulation may comprise first and second parts, wherein the first part consists essentially of the (hydrolyzable silyl group)-functional polyethylene copolymer and optionally any one or more of additives (C) to (I); and the second part consists essentially of the (B) condensation cure catalyst or catalyst masterbatch comprising a carrier resin (as an example of the (I) polymer that is not (A)) and (B), and an optional additional portion of (A) HSG-FP Copolymer and optionally any one or more of additives (C) to (I).

The moisture-curable polyethylene formulation may be free of water (anhydrous), alternatively may further comprise water.

The (A) (hydrolyzable silyl group)-functional polyethylene copolymer ("HSG-FP Copolymer"). A macromolecule, or a collection thereof, that is/are a reactor-copolymer of ethylene (monomer) and the at least one alkenyl-functional hydrolyzable silane comonomer. The (A) HSG-FP Copolymer is a random copolymer having at least 70 wt %, alternatively at least 73 wt %, alternatively at least 83 wt %, alternatively at least 93 wt % ethylenic constituent units; from 0.38 to 0.99 mol % hydrolyzable silyl group-containing comonomeric units derived from the at least one alkenyl-unsaturated hydrolyzable silane; from 0 to 2 wt % propylenic constituent units derived from propylene, if any; and/or from 0 to 20 wt % ($C_4$-$C_{20}$)alpha-olefinic constituent units derived from ($C_4$-$C_{20}$)alpha-olefin, if any. The different types of constituent units are randomly intermingled with each other along the backbone portion of (A). The backbone portion of the (A) HSG-FP Copolymer is structurally different than a homogeneous backbone portion of an HSG-grafted polyethylene homopolymer or a segmented backbone of a polyorganosiloxane-polyethylene block copolymer. The (A) may be free of post-HPT reactor process-grafted hydrolyzable silyl groups.

All other things being equal, the higher the HPT reactor temperature and/or pressure used in the process of making the (A) HSG-FP Copolymer, the higher the molecular mass dispersity of (A). All other things being equal, the higher the absolute molecular weight ratio ($M_{z(abs)}/M_{w(abs)}$) of the (A) HSG-FP Copolymer, the faster and/or greater extent of curing of the moisture-curable polyethylene formulation. All other things being equal, the higher the dispersity ratio (($M_{z(abs)}/M_{w(abs)}$)/($M_{w(conv)}/M_{n(conv)}$)), the faster and/or greater extent of curing of the formulation. As a result, if desired, the formulation may be readily moisture cured under ambient conditions comprising 23° C. and 50% RH. All other things being equal, the higher the hydrolyzable silyl group content of the (A) HSG-FP Copolymer, the faster and/or greater extent of curing of the moisture-curable polyethylene formulation.

The (A) HSG-FP Copolymer is free of a metal-containing olefin polymerization catalyst, and thus free of by-products derived from such a catalyst such as residual catalyst metal content and/or residual catalyst ligands. Examples of the excluded metal-containing olefin polymerization catalyst are chrome and chromium oxide catalysts, metallocene catalysts, post-metallocene catalysts, and Ziegler-Natta catalysts. Thus, the (A) HSG-FP Copolymer is free of a metal selected from chromium, titanium, zirconium, and hafnium and free of organic ligands used in metallocene or post-metallocene catalysts.

The (A) HSG-FP Copolymer is a copolymer. This means (A) comprises polyethylene molecules containing covalently-bonded, condensation curable silicon-containing groups, wherein the polyethylene molecules are capable of further polymerization via water-based condensation curing to form covalent siloxy-silyl crosslinks between different chains of the polyethylene molecules, thereby contributing more than one structural unit to at least one type of chain of a resulting moisture-cured polymer product, which contains the siloxy-silyl crosslinks (Si—O—Si) bonded to carbon atoms of the different chains.

The (A) HSG-FP Copolymer is made using an organic peroxide in the HPT reactor to initiate and continue the copolymerizing. The organic peroxide may be an organohydrogenperoxide such as tert-butyl peroxyacetate; 1,1-dimethylethyl hydroperoxide; 1,1-dimethylpropyl hydroperoxide; benzoyl hydroperoxide; tert-butyl hydroperoxide; tert-amyl hydroperoxide; or a cumyl hydroperoxide. Alternatively, the organic peroxide may be a diorganoperoxide such as bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid;

butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butyl-peroxyisopropyl) benzene ("BIPB"); isopropylcumyl t-butyl peroxide; t-butylcumylperoxide; di-t-butyl peroxide; 2,5-bis(t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; di(isopropylcumyl) peroxide; or dicumyl peroxide.

The at least one alkenyl-functional hydrolyzable silane used to make the (A) HSG-FP Copolymer may be of formula (III): $(R^2)_m(R^3)_{3-m}Si-Q_q-(C_2-C_6)$alkenyl (III), wherein m, $R^2$, and $R^3$ are as defined above for formula (II), subscript q is 0 or 1, and divalent group Q is a $(C_1-C_6)$alkylene-C(=O)— or a $(C_1-C_6)$alkylene-OC(=O)—. The $(C_2-C_6)$ alkenyl may be vinyl, allyl, isoprenyl, 3-butenyl, or 5-hexenyl. Each $(C_1-C_6)$alkylene may be straight chain or branched chain. Examples of $(C_1-C_6)$alkylene are $(C_4-C_6)$alkylene, $(C_1-C_3)$alkylene, $CH_2$, $CH_2CH_2$, $CH_2CH_2CH_2$, and $CH_2C(CH_3)_2$—. The (A) HSG-FP Copolymer may be a reactor copolymer of ethylene and at least one, alternatively at most two, alternatively one of vinyltrimethoxysilane, (acryloxypropyl)trimethoxysilane, (methacryloxypropyl)trimethoxysilane, vinyltri(2-propanone oximo)silane, or vinyl(tris(diethylamino)silane. Vinyltrimethoxysilane is an example of the at least one alkenyl-functional hydrolyzable silane of formula (III) wherein subscript m is 3, subscript q is 0, each $R^2$ is a $(C_1-C_6)$alkoxy (i.e., methoxy); and the $(C_2-C_6)$alkenyl is vinyl (—C(H)=CH$_2$). The comonomeric units in the (A) HSG-FP Copolymer derived from the at least one alkenyl-functional hydrolyzable silane are called herein alkylene-hydrolyzable silyl group units because the alkenyl group of the at least one alkenyl-functional hydrolyzable silane reacts during the copolymerizing to form a divalent alkylene linking group that covalently bonds the hydrolyzable silyl group in the HSG-FP Copolymer.

The (A) HSG-FP Copolymer may have a crystallinity at room temperature (23° C.) of less than or equal to 45.0 wt %, alternatively from 5 to 44.4 wt %, alternatively from 15 to 44.4 wt %, alternatively from 25 to 44.4 wt %, alternatively less than 44.5 wt %, alternatively from 35 to 44.4 wt %, alternatively from 42.0 to 44.1 wt %, as measured according to the Crystallinity Test Method, described later. Compared to an HSG-FP Copolymer that has a crystallinity at room temperature (23° C.) of greater than 45 wt %, these embodiments of the (A) HSG-FP Copolymer may beneficially yield faster moisture curing at ambient or room temperature conditions and/or improved filler acceptance (ability to accept higher filler loadings).

The (A) HSG-FP Copolymer may be present in the moisture-curable polyethylene formulation at from 25.0 to 99.99 wt %, alternatively from 25.0 to 99.90 wt %, alternatively from 45 to 99.99 wt %, alternatively from 45 to 99.90 wt %, alternatively from 50.9 to 99.90 wt %, alternatively from 65.0 to 99.90 wt %, alternatively from 88 to 97 wt %, alternatively 89.0 to 95.0 wt %, with the proviso that when (B) is a dialkyltin dicarboxylate, (A) is at most 99.90 wt % of the formulation, all based on total weight of the formulation. When (B) is a sulfonic acid or blocked sulfonic acid, (A) is from 25 to 99.99 wt % of the formulation, alternatively any one of the aforementioned (A) subranges.

The (B) condensation cure catalyst. The (B) condensation cure catalyst may also be referred to as a silanol condensation catalyst. The (B) condensation cure catalyst, however, is not limited to catalyzing condensation curing of silanol groups per se. The (B) may catalyze condensation curing of, for example, a monovalent group of formula $(R^2)_m(R^3)_{3-m}Si-Q_q-(C_2-C_6)$alkyl, wherein subscripts m and q, monovalent groups $R^2$ and $R^3$, and divalent group Q are defined as described above. Examples of $(R^2)_m(R^3)_{3-m}Si$— are alkoxysilyl groups, oximinosilyl groups, dialkylaminosilyl groups, and alkylaminosilyl groups. The (B) may be any acid capable of lowering pH of pH 7.00 water to pH<6.00 or a base capable of raising pH of pH 7.00 water to pH>8.00.

The (B) condensation cure catalyst may comprise the dialkyltin dicarboxylate. The dialkyltin dicarboxylate may be a di(($C_1-C_{10}$)alkyl)tin dicarboxylate, alternatively a dialkyltin di($C_8-C_{18}$)carboxylate, alternatively a di(($C_1-C_{10}$)alkyl)tin di($C_8-C_{18}$)carboxylate, alternatively a di(($C_3-C_5$)alkyl)tin di($C_{10}-C_{14}$)carboxylate, alternatively a di(($C_4$)alkyl) tin di($C_{12}$)carboxylate, alternatively dibutyltin dilaurate (DBTDL). When the dialkyltin dicarboxylate is the only (B) in the formulation, it is present therein at 0.10 wt % or higher, alternatively 0.12 wt % or higher.

The (B) condensation cure catalyst may comprise the sulfonic acid. The sulfonic acid may be a sulfonic acid of formula $RSO_3H$ wherein R is $(C_1-C_{10})$alkyl, $(C_6-C_{10})$aryl, a $(C_1-C_{10})$alkyl-substituted $(C_6-C_{10})$aryl, or a $(C_6-C_{10})$aryl-substituted $(C_1-C_{10})$alkyl. The sulfonic acid may be a hydrophobic sulfonic acid, which may be a sulfonic acid having a solubility in pH 7.0 distilled water of from 0 to less than 0.1 g/mL at 23° C. after 24 hours. The sulfonic acid may be methanesulfonic acid, benzenesulfonic acid, an alkylbenzenesulfonic acid (e.g., 4-methylbenzenesulfonic acid, dodecylbenzenesulfonic acid, or a dialkylbenzenesulfonic acid), naphthalenesulfonic acid, or an alkylnaphthalenesulfonic acid. The $(C_6-C_{10})$arylsulfonic acid may be benzenesulfonic acid or naphthalenesulfonic acid. The sulfonic acid may consist of carbon atoms, hydrogen atoms, one sulfur atom, and three oxygen atoms.

The (B) condensation cure catalyst may comprise the blocked sulfonic acid. The blocked sulfonic acid may be as defined in US 2016/0251535 A1 and may be a compound that generates in situ the sulfonic acid of formula $RSO_3H$ wherein R is as defined above upon heating thereof, optionally in the presence of moisture or an alcohol. Examples of the blocked sulfonic acid include amine-sulfonic acid salts and sulfonic acid alkyl esters. The blocked sulfonic acid may consist of carbon atoms, hydrogen atoms, one sulfur atom, and three oxygen atoms, and optionally a nitrogen atom.

The (B) condensation cure catalyst may comprise a combination of the dialkyltin dicarboxylate and the sulfonic acid. The dialkyltin dicarboxylate may be dibutyltin dilaurate and the sulfonic acid may be an arylsulfonic acid or an alkyl-substituted arylsulfonic acid. The aryl sulfonic acid may be benzenesulfonic acid or naphthalenesulfonic acid.

The (B) condensation cure catalyst may be present in the moisture-curable polyethylene formulation at from 0.01 to 5 wt %, alternatively from 0.010 to 5.0 wt %, alternatively from 0.05 to 5.0 wt %, alternatively from 0.10 to 5.0 wt %, alternatively from 0.11 to 0.50 wt %, alternatively from 0.50 to 1.0 wt %, alternatively from 1.0 to 4.0 wt %; with the proviso that when (B) is only a dialkyltin dicarboxylate, the dialkyltin dicarboxylate is at least 0.10 wt %, alternatively at least 0.11 wt %, and (A) is at most 99.90 wt %, alternatively at most 99.89 wt % of the formulation. When (B) is a sulfonic acid or blocked sulfonic acid, the sulfonic acid or blocked sulfonic acid is from 0.01 to 5 wt % of the formulation, alternatively any one of the aforementioned (B) subranges.

Optional additive (C) an antioxidant: an organic molecule that inhibits oxidation, or a collection of such molecules.

The (C) antioxidant is different in composition than the (F) stabilizer, which means when the formulation contains both (C) and (F), the compound used as (C) is different than that used as (F). The (C) antioxidant functions to provide antioxidizing properties to the moisture-curable polyethylene formulation and/or cured polymer product. Examples of suitable (C) are bis(4-(1-methyl-1-phenylethyl)phenyl) amine (e.g., NAUGARD 445); 2,2'-methylene-bis(4-methyl-6-t-butylphenol) (e.g., VANOX MBPC); 2,2'-thiobis (2-t-butyl-5-methylphenol (CAS No. 90-66-4; 4,4-thiobis(2-t-butyl-5-methylphenol) (also known as 4,4'-thiobis(6-tert-butyl-m-cresol), CAS No. 96-69-5, commercially LOWINOX TBM-6); 2,2'-thiobis(6-t-butyl-4-methylphenol (CAS No. 90-66-4, commercially LOWINOX TBP-6); tris [(4-tert-butyl-3-hydroxy-2,6-dimethylphenyl)methyl]-1,3, 5-triazine-2,4,6-trione (e.g., CYANOX 1790); pentaerythritol tetrakis(3-(3,5-bis(1,1-dimethylethyl)-4-hydroxyphenyl) propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); distearyl thiodipropionate ("DSTDP"); dilauryl thiodipropionate (e.g., IRGANOX PS 800); stearyl 3-(3,5-di-t-butyl-4-hydroxyphenyl)propionate (e.g., IRGANOX 1076); 2,4-bis(dodecylthiomethyl)-6-methylphenol (IRGANOX 1726); 4,6-bis(octylthiomethyl)-o-cresol (e.g. IRGANOX 1520); and 2',3-bis[[3-[3,5-di-tert-butyl-4-hydroxyphenyl]propionyl]]propionohydrazide (IRGANOX 1024). The (C) may be 4,4-thiobis(2-t-butyl-5-methylphenol) (also known as 4,4'-thiobis(6-tert-butyl-m-cresol); 2,2'-thiobis(6-t-butyl-4-methylphenol; tris[(4-tert-butyl-3-hydroxy-2,6-dimethylphenyl)methyl]-1,3,5-triazine-2,4,6-trione; distearyl thiodipropionate; or dilauryl thiodipropionate; or a combination of any two or more thereof. The combination may be tris[(4-tert-butyl-3-hydroxy-2,6-dimethylphenyl)methyl]-1,3,5-triazine-2,4,6-trione and distearyl thiodipropionate. The formulation and/or cured polymer product may be free of (C). When present, the (C) antioxidant may be from 0.01 to 1.5 wt %, alternatively 0.1 to 1.0 wt % of the total weight of the formulation and/or product.

Optional additive (D) a colorant. E.g., a pigment or dye. E.g., carbon black or titanium dioxide. The carbon black may be provided as a carbon black masterbatch that is a formulation of poly(1-butene-co-ethylene) copolymer (from ≥95 wt % to <100 wt % of the total weight of the masterbatch) and carbon black (from >0 wt % to ≤; 5 wt % of the total weight of the masterbatch. Carbon black is a finely-divided form of paracrystalline carbon having a high surface area-to-volume ratio, but lower than that of activated carbon. Examples of carbon black are furnace carbon black, acetylene carbon black, conductive carbons (e.g., carbon fibers, carbon nanotubes, graphene, graphite, and expanded graphite platelets). The moisture-curable polyethylene formulation and/or cured polymer product may be free of (D). When present (D) may be from 0.1 to 35 wt %, alternatively 1 to 10 wt % of the formulation.

Optional additive (E) moisture scavenger. The (E) moisture scavenger functions to inhibit premature moisture curing of the moisture-curable polyethylene formulation, wherein premature moisture curing would result from premature or prolonged exposure of the formulation to ambient air or when the formulation is at ambient temperature or elevated temperature (e.g., during melt extrusion). Examples of (E) are hexadecyltrimethoxysilane, octyltriethoxysilane, and octyltrimethoxysilane. The formulation and/or cured polymer product may be free of (E). When present (E) may be from 0.001 to 5.0 wt %, alternatively 0.01 to 3.0 wt %, alternatively 0.10 to 1.5 wt %, alternatively 0.15 to 1.0 wt % of the formulation.

Optional additive (F) a stabilizer for stabilizing the moisture-curable polyethylene formulation against ultraviolet light (UV stabilizer). The (F) stabilizer is different in composition than the (C) antioxidant, which means when the formulation contains both (C) and (F), the compound used as (C) is different than that used as (F). Examples are a hindered amine light stabilizer (HALS), a benzophenone, or a benzotriazole. The (F) may be a molecule that contains a basic nitrogen atom that is bonded to at least one sterically bulky organo group and functions as an inhibitor of degradation or decomposition, or a collection of such molecules. The HALS is a compound that has a sterically hindered amino functional group and inhibits oxidative degradation and can also increase the shelf lives of embodiments of the formulation that contain organic peroxide. Examples of suitable (F) are butanedioic acid dimethyl ester, polymer with 4-hydroxy-2,2,6,6-tetramethyl-1-piperidine-ethanol (CAS No. 65447-77-0, commercially LOWILITE 62); and N,N'-bisformyl-N,N'-bis(2,2,6,6-tetramethyl-4-piperidinyl)-hexamethylenediamine (CAS No. 124172-53-8, commercially Uvinul 4050 H). The formulation and product may be free of (F). When present, the (F) UV stabilizer may be from 0.001 to 1.5 wt %, alternatively 0.002 to 1.0 wt %, alternatively 0.05 to 0.1 wt % of the formulation.

Optional additive (G) processing aid: a molecule that decrease adherence of polymer melts in manufacturing equipment such as extruders and dies and to decrease melt fracture of materials. The (G) may be fluoropolymers, polyorganosiloxanes, metal salts of fatty carboxylic acids, fatty carboxamides, waxes, ethylene oxide (co)polymers, and non-ionic surfactants. The formulation and product may be free of (G). When present, the (G) processing aid may be from 0.05 to 5 wt % of the formulation.

Optional additive (H) flame retardant. The (H) flame retardant is a compound that inhibits or delays the spread of fire by suppressing chemical reactions in a flame. The (H) flame retardant may be (H1) a mineral, (H2) an organohalogen compound, (H3) an (organo)phosphorus compound; (H4) a halogenated silicone; (H5) a combination of any two or more of (H1) to (H4); (H6) a combination of any one of (H1) to (H4) and a flame retardant synergist (e.g., antimony trioxide). The formulation and product may be free of (H). When present, the (H) flame retardant may be from 0.1 to 80.0 wt %, alternatively 1 to 50.0 wt %; and alternatively 5 to 30.0 wt % of the formulation.

The moisture-curable polyethylene formulation may further comprise the (I) polymer that is not (A) or a styrenic polymer (which is not (A)). The (I) polymer that is not (A) may be a polyolefin-based macromolecule different in composition than the (A) HSG-FP Copolymer. The (I) polymer that is not (A) may be a polyolefin, a styrenic polymer, a rubber, or a blend of any two or more thereof. The (I) polymer that is not (A) may be a polyolefin that is an ethylene-based polymer, a propylene-based polymer, a poly ($C_4$-$C_8$)alpha-olefin based polymer, a polydiene, or a blend of any two or more thereof. The ethylene-based polymer may be a linear low density polyethylene (LLDPE); a medium density polyethylene (MDPE); a high density polyethylene (HDPE; a high density polyethylene (HDPE) homopolymer made by coordination polymerization; a low density polyethylene (LDPE) homopolymer made by radical polymerization; an ethylene/propylene copolymer; an ethylene/1-butene copolymer; an ethylene/1-hexene copolymer; an ethylene/1-octene copolymer; an ethylene/diene copolymer; an ethylene/propylene/alpha-olefin copolymer; an ethylene/propylene/diene (EPDM) copolymer; an ethylene/vinyl acetate (EVA) copolymer; an ethylene/alkyl (meth)acrylate (EAA) copolymer; an acrylate-terminated oligomer or polymer (not an EAA polymer) free of silicon atoms; or an ethylene/maleic anhydride copolymer. The (I) may be a styrenic polymer. Or (I) may be a natural rubber; nitrile rubber; a chlorosulfonated polyethylene (CSM); a chlorinated polyethyl (CPE); a neoprene rubber; or a butyl rubber. Or (I) may be a vinyl-terminated organosiloxane oligomer; or allyl-terminated organosiloxane oligomer. The (I) may be an LLDPE, LDPE, MDPE, HDPE, EVA copolymer, or EEA copolymer; alternatively LLDPE, LDPE, MDPE, or HDPE; alternatively LLDPE; alternatively EVA or EEA copolymer.

The (I) polymer that is not (A) may be a reactor homopolymer of ethylene having a carbon atom backbone having the hydrolyzable silyl groups grafted thereonto, such as a polymer made by a process (e.g., a SIOPLAS™ process) comprising reactively grafting a hydrolyzable unsaturated silane (e.g., vinyltrimethoxysilane) in a post-polymerization compounding or extruding step, typically facilitated by a free radical initiator such as a dialkyl peroxide, and isolating the resulting silane-grafted polymer. The grafted polymer may be for used in a subsequent fabricating step. The SIOPLAS™ process is described in, for example, U.S. Pat. No. 3,646,155 and WO 2019/005439 A1.

The (I) polymer that is not (A) may be used in the moisture-curable polyethylene formulation in neat form (i.e., free of (B) condensation cure catalyst and any additive such as additives (C) to (H)). Alternatively, the (I) polymer that is not (A) may be used in the formulation in a masterbatch form comprising the (I) as a carrier resin and at least one additive selected from the (B) condensation cure catalyst and any additive such as additives (C) to (H). The masterbatch comprising the (I) as a carrier resin and (B) is a catalyst masterbatch. The masterbatch comprising the (I) as a carrier resin and any one or more of (C) to (H) is an additive masterbatch. The masterbatch comprising the (I) as a carrier resin, (B), and any one or more of (C) to (H) is a combined catalyst and additive masterbatch. Catalyst masterbatches and additive masterbatches may be commercially available.

The amount of the (I) polymer that is not (A) in the moisture-curable polyethylene formulation may be 0 wt % when the (I) polymer that is not (A) is absent or from >0 to 85 wt % when the (I) polymer that is not (A) is present. When present, the (I) polymer that is not (A) may be from >0 to 10 wt %, alternatively from >10 to 50 wt %, alternatively from 51 to 85 wt %, alternatively from 41 to 49 wt %, of the formulation.

The moisture-curable polyethylene formulation may further comprise one or more other additives as optional additives such as an organic peroxide (e.g., dicumyl peroxide or tert-butyl peroxyacetate), a scorch retardant (e.g., 2,4-diphenyl-4-methyl-1-pentene (also known as alpha-methyl styrene dimer or AMSD)), a treeing retardant (water or electrical treeing retardant, e.g., a polyethylene glycol), a moisture generator (for generating water in situ, e.g., calcium oxalate monohydrate), a hydroxyl-functional organosiloxane (e.g., a hydroxyl-terminated polydimethylsiloxane), a lubricant, a mineral oil, an anti-blocking agent, a metal deactivator (e.g., oxalyl bis(benzylidene)hydrazide (OABH)), a coagent, a nucleating agent, or a combination of any two or more thereof.

The moisture-curable polyethylene formulation may further comprise 0.01 to 4.5 wt % of the organic peroxide, added thereto after the (A) HSG-FP Copolymer is made. This formulation may be further cured by free-radical curing, and the cured polymer product further comprises Si-atom free crosslinking groups. This aspect enables dual curing mechanisms to give an embodiment of the cured polymer product that is a product of moisture curing and free-radical curing of the formulation. Moisture curing may form crosslinks between the hydrolyzable silane groups of (A) wherein the crosslinks have a C—Si-O-Si—C bond motif. The free-radical curing enabled by the organic peroxide may form carbon-carbon bond crosslinks between polymer chains of (A). The dual cured product thus has a different crosslinked structure than that of a moisture cured-only product, and thus may have different mechanical properties (e.g., modulus, hot creep performance) versus a moisture-cured only product.

The (A) HSG-FP Copolymer and/or the (I) polymer that is not (A) may have comonomeric constituent units derived from a $(C_4-C_{20})$alpha-olefin. The $(C_4-C_{20})$alpha-olefin may be a compound of formula (1): $H_2C=C(H)CH_2R$ (1), wherein R is a straight chain $(C_1-C_{18})$alkyl group. The $(C_1-C_{18})$alkyl group is a monovalent unsubstituted saturated hydrocarbon having from 1 to 18 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3-C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an α-olefin such as 3-cyclohexyl-1-propene (allyl cyclohexane) and vinyl cyclohexane. The $(C_4-C_{20})$alpha-olefin may be a $(C_4-C_8)$alpha-olefin; alternatively 1-butene, 1-hexene, 1-octene, or a combination of any two thereof; alternatively 1-butene; alternatively 1-hexene; alternatively 1-octene; alternatively a combination of any two thereof.

The combination of optional additives may be any two, alternatively any five, alternatively each of (C), (D), (E), (F), (H), and (I). These are in addition to and different than the constituents (A) and (B).

Any additive may be useful for imparting at least one characteristic or property to an embodiment in need thereof, which includes the formulation, product, or method. The characteristic or property may improve performance of the embodiment such as where the embodiment is exposed to elevated temperature as in operations or applications that include melt mixing, extruding, molding, hot water, and insulating (electrical power cable).

For clarity, Lewis and Brønsted acids are defined herein to be mutually exclusive and Lewis and Brønsted bases defined herein to be mutually exclusive (non-overlapping).

Brønsted acid. A molecular entity capable of donating a hydron (proton) to a base (i.e., a hydron donor) or the corresponding chemical species, with the proviso that the molecular entity or corresponding chemical species is characterized by a logarithm (log) of acid dissociation constant (pKa) less than 6.0. Examples: molecular entities $CH_3CO_2H$, $H_2SO_4$, $HSO_4^-$, HCl, and $CH_3SO_3H$ and chemical species $H_3O$—. Not $H_2O$, $CH_3OH$, or $NH_3$.

Brønsted base. A molecular entity capable of accepting a hydron (proton) from an acid (i.e., a hydron acceptor) or the corresponding chemical species, with the proviso that a conjugate acid derivative of the molecular entity or the corresponding chemical species is characterized by a pKa greater than 8.00. Examples: molecular entities $NH_3$, amines (pyridine; 1°, 2°, and 3° alkyl and/or aryl amines), and $OH^-$. Not $SO_4^{2-}$, $Cl^-$, $CH_3CO_2^-$, or $CH_3SO_3^-$.

Lewis acid that is not the Brønsted acid. A molecular entity or the corresponding chemical species that is an electron-pair acceptor and therefore able to react with a Lewis base to form a Lewis adduct, by sharing the electron pair furnished by the Lewis base. Examples: a dialkyltin dicarboxylate, a dialkyltin hydroxy monocarboxylate, a dialkyltin maleate, tin carboxylates, lead or cobalt naphthenate, and zinc caprylate.

Lewis base that is not the Brønsted base. A molecular entity or the corresponding chemical species able to provide a pair of electrons and thus capable of coordination to a Lewis acid, thereby producing a Lewis adduct. Examples trialkyl- and triaryl-phosphines.

Monomer-based polymer: a polymer or copolymer having 50.1 to 100 wt % of monomeric units and from 49.9 to 0 wt % comonomeric units (e.g., an ethylene-based polymer ("ethylenic polymer") having at least 50.1 to 100 wt % of ethylenic units and 49.9 to 0 wt % hydrolyzable silyl group-containing units).

Olefinically unsaturated. A molecule containing a carbon-carbon double or triple bond, alternatively one a carbon-carbon double bond.

Substitution: any one, all but one, or each functional group may be unsubstituted.

Alternatively precedes a distinct embodiment. May confers a choice, not an imperative. Optional(ly): is absent (or excluded), alternatively is present (or included).

Crystallinity Test Method: determine melting peaks and percent (%) or weight percent (wt %) crystallinity of ethylene-based polymers using Differential Scanning Calorimeter (DSC) instrument DSC Q1000 (TA Instruments). (A) Baseline calibrate DSC instrument. Use software calibration wizard. Obtain a baseline by heating a cell from −80° to 280° C. without any sample in an aluminum DSC pan. Then use sapphire standards as instructed by the calibration wizard. Analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° C. to 180° C. at a heating rate of 10° C./minute. Determine that indium standards sample has heat of fusion=28.71±0.50 Joules per gram (J/g) and onset of melting=156.6°±0.5° C. (B) Perform DSC measurements on test samples using the baseline calibrated DSC instrument. Press test sample of semi-crystalline ethylenic polymer into a thin film at a temperature of 160° C. Weigh 5 to 8 mg of test sample film in aluminum DSC pan. Crimp lid on pan to seal pan and ensure closed atmosphere. Place lid-sealed pan in DSC cell, equilibrate cell at 30° C., and then heat at a rate of about 100° C./minute to 190° C., keep sample at 190° C. for 3 minutes, cool sample at a rate of 10° C./minute to −60° C. to obtain a cool curve heat of fusion ($H_f$), and keep isothermally at −60° C. for 3 minutes. Then heat sample again at a rate of 10° C./minute to 190° C. to obtain a second heating curve heat of fusion ($\Delta H_f$). Using the second heating curve, calculate the "total" heat of fusion (J/g) by integrating from −20° C. (in the case of ethylene homopolymers, copolymers of ethylene and hydrolysable silane monomers, and ethylene alpha olefin copolymers of density greater than or equal to 0.90 g/cm³) or −40° C. (in the case of copolymers of ethylene and unsaturated esters, and ethylene alpha olefin copolymers of density less than 0.90 g/cm³) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "Crystallinity at room temperature" (computed from 23° C. heat of fusion). Crystallinity is measured and reported as percent (%) or weight percent (wt %) crystallinity of the polymer from the test sample's second heating curve heat of fusion ($\Delta H_f$) and its normalization to the heat of fusion of 100% crystalline polyethylene, where % crystallinity or wt % crystallinity= ($\Delta H_f$*100%)/292 J/g, wherein $\Delta H_f$ is as defined above, * indicates mathematical multiplication, / indicates mathematical division, and 292 J/g is a literature value of heat of fusion ($\Delta H_f$) for a 100% crystalline polyethylene.

Density: measured according to ASTM D792-13, *Standard Test Methods for Density and Specific Gravity (Relative Density) of Plastics by Displacement*, Method B (for testing solid plastics in liquids other than water, e.g., in liquid 2-propanol). Units of grams per cubic centimeter (g/cm³).

Melt Index ("$I_2$"): measured according to ASTM D1238-13, using conditions of 190° C./2.16 kg, formerly known as "Condition E". Units of grams per 10 minutes (g/10 min.).

Use a Triple Detector Gel Permeation Chromatography (3D-GPC or TDGPC) system consisting of a PolymerChar (Valencia, Spain) high temperature chromatograph GPC-IR, equipped with a 2-angle laser light scattering (LS) detector Model 2040 from Precision Detectors, now Agilent Technologies (CA, USA), a 4-capillary solution viscometer (DP) from PolymerChar, and an online solvent degassing device from Agilent Technologies. Collect data using Polymer Char "GPC One" software. Use high temperature GPC columns consisting of four 30-centimeter (cm)×20-micrometer (µm) mixed A LS columns from Agilent Technologies. Operate the GPC-IR autosampler oven at 160° C. and column compartment at 150° C. Prepare test samples semi-automatically via dosing from the GPC-IR syringe at a concentration of 2 milligrams (mg) test sample per milliliter (mL) of $N_2$-sparged 1,2,4-trichlorobenzene (TCB) solvent containing 200 parts per million of BHT (2,6-ditert-butyl)-4-methylphenol) with an including decani flow rate marker delivered via micro pump. Shake test samples at 160° C. for three hours. Inject 200 microliters (µL) of test sample; elute at flow rate of 1.0 milliliter per minute (mL/min.); and record elution volumes. Arrange 21 narrow molecular weight distribution polystyrene (PS) standards (molecular weights from 580 to 8,400,000 g/mol from Polymer Laboratories (now Agilent Technologies)) in 6 "cocktail" mixtures with at least a decade of separation between individual molecular weights with individual concentrations ranging from 0.25 (peak molecular weight (Mp)>500,000) to 0.5 mg/mL (Mp<500,000) by dissolving them for 24 hours in TCB at room temperature in the dark.

Calibrate columns and perform molecular weight calculations using Polymer Char "GPC One" software. Convert peak molecular weights (Mp) of PS standards to polyethylene molecular weights using the following equation (described in Williams and Ward, J. Polym. Sci., Polym. Let., 1968, vol. 6, p. 621): $M_{polyethylene}=A\ (M_{polystyrene})B$, wherein calibration point B is 1.0 and calibration point A is from 0.38 to 0.44. Obtain a column calibration curve by fitting a first-order polynomial expression to the calibration points A and B and to the recorded elution volumes. The calibration point A is experimentally determined by adjusting the A value until weight-average molecular weight ($M_w$) calculated according to the above equation and the corresponding retention volume polynomial agree with an independently determined value of $M_w$, obtained in accordance with a linear polyethylene homopolymer reference with known absolute weight-average molecular weight of 115,000 g/mol as measured by LALLS (low-angle laser light scattering) in a manner traceable to standard homopolymer polyethylene NBS1475.

Calculate conventional number-average molecular weights ($M_{n(conv)}$) and conventional weight-average molecular weights ($M_{w(conv)}$) according to the respective following equations:

$$\overline{Mn} = \frac{\sum_i Wf_i}{\sum_i (Wf_i / M_i)} \text{ and } \overline{Mw} = \frac{\sum_i (Wf_i * M_i)}{\sum_i Wf_i};$$

wherein $W_{fi}$ is the weight component and $M_i$ is the molecular weight of the i-th component. Calculate molecular mass dispersity ($M_w/M_n$), $Đ_M$ (pronounced "dee-stroke em", also known as polydispersity or conventional molecular mass dispersity) as the ratio of the conventional average molecular weights $M_{w(conv)}/M_{n(conv)}$.

Calculate absolute weight-average molecular weight ($M_{w(abs)}$) by baseline-subtracted LS(15 degree angle) and IR-5 (measurement signal) concentration detectors using the following equation:

$$Mw(abs) = K_{LS} * \frac{\sum (LS_i)}{\sum (IR_i)};$$

wherein $\Sigma(LS_i)$ is the response of the LS area detector; $\Sigma(IR_i)$ is the response area of the IR-4 detector; and $K_{LS}$ is the instrument constant determined using a standard NIST 1475 with known concentration and certified value for $M_w$=52,000 g/mol. Calculate absolute molecular weight at each elution volume using the following equation:

$$M_{LS,i} = K_{LS} * \frac{LS_i}{IR_i};$$

wherein $K_{LS}$ is as defined above and LSi and IRi are baseline-subtracted LS(15 degree angle) and IR-5 (measurement signal) detector responses, respectively, of the same i-th elution component.

Calculate absolute number-average molecular weight ($M_n$ (abs)) and absolute z-average molecular weight ($M_{z(abs)}$) using the respective following equations:

$$Mn(abs) = K_{LS} \frac{\sum (IR_i)}{\sum (IR_i) / \left(\frac{LS_i}{IR_i}\right)} \text{ and } Mz(abs) = K_{LS} \frac{\sum IR_i * \left(\frac{LS_i}{IR_i}\right)^2}{\sum IR_i * \left(\frac{LS_i}{IR_i}\right)};$$

wherein the terms are defined above. If log($M_{LS,i}$) data are scattered due to low LS(15 degree angle) or IR-5 (measurement signal) detector responses, then perform a linear extrapolation on a plot of log($M_{LS,i}$) versus elution volume. Compute the ratio of absolute z-average molecular weight to absolute number-average molecular weight ($M_{z(abs)}/M_{n(abs)}$).

Use XRF spectroscopy to determine weight percent (wt %) of silicon atom (Si) content of, and then calculate hydrolyzable silane comonomeric unit wt % in, test samples of the (A) HSG-FP Copolymer. Using a Buehler SimpliMet 300 automatic mounting press that is preheated for 3 minutes at 115.6° C. (240 degrees Fahrenheit (° F.)), press a powdered form of test sample for 1 minute under 8.3 megapascals (MPa; 1,200 pounds per square inch (psi)) to form a plaque having a thickness of about 6 mm, and cool the plaque to 25° C. Analyze the Si atom content of the plaque by wavelength dispersive XRF using a wavelength dispersive X-ray fluorescence spectrometer from PANalytical Axios. Determine Si atom content by comparing its line intensity in the XRF spectrum to a calibration curve for Si atom content that is established using polymer standards of known Si atom concentrations as independently measured using Neutron Activation Analysis (NAA) or Inductively Coupled Plasma (ICP) methods. Use the XRF measured Si atom wt % value, and the molecular weight(s) of the at least one alkenyl-functional hydrolyzable silane comonomer from which the hydrolyzable silyl groups were derived, to calculate hydrolyzable silyl group comonomeric unit wt % (i.e., wt % of the hydrolyzable silyl groups) in the (A) HSG-FP Copolymer. For hydrolyzable silyl groups derived from vinyltrimethoxysilane (VTMS), use the VTMS molecular weight of 148.23 g/mol. To calculate hydrolyzable silyl group content of (wt % of hydrolyzable silyl group comonomeric units in) the (A) HSG-FP Copolymer, use the XRF obtained Si atom wt % ("C") and the following formula: p=C*(m/28.086)(1/10000 ppmw), wherein * means multiplication, / means division, p is wt % hydrolyzable silyl groups in (A), C is the Si atom amount (XFR) in weight parts per million (ppmw), m is the molecular weight in g/mol of the at least one alkenyl-functional hydrolyzable silane comonomer from which the hydrolysable silyl groups are derived, 28.086 is the atomic weight of a silicon atom, and 10000 ppmw is the number of weight parts per million in 1.00 wt %. For example, when XRF shows 379 ppmw of Si atom in (A) HSG-FP Copolymer and the comonomer used to make (A) is VTMS having a molecular weight of 148.23 g/mol, the wt % comonomeric content is 0.20 wt %. To calculate mol % of hydrolyzable silyl group comonomeric units in the (A) HSG-FP Copolymer of the at least one alkenyl-functional hydrolyzable silane comonomer used, use the calculated wt % of the hydrolyzable silyl group comonomeric units in (A) and the following equation: G=100*(p/m)/[(p/m)+(100.00 wt %−p)/28.05 g/mol], wherein * means multiplication, G is mole percent (mol %) of hydrolysable silyl groups in (A); p is wt % of hydrolysable silyl groups in (A), m is molecular weight in g/mol of the at least one alkenyl-functional hydrolyzable silane comonomer from which the hydrolysable silyl groups are derived, and 28.05 g/mol is the molecular weight of monomer ethylene ($H_2C=CH_2$). For example, when comonomeric content is 2.0 wt % and the comonomer is VTMS, p=2.0 wt % and m=148.23 g/mol, and G=0.38 mol %. When comonomeric content is 5.0 wt % and the comonomer is VTMS, p=5.0 wt % and m=148.23 g/mol, and G=0.99 mol %. When two or more alkenyl-functional hydrolyzable silane comonomers having different molecular weights are used to make (A), the molecular weight used in the calculation of the total mol % of all hydrolyzable silyl groups in (A) is a weighted average molecular weight of the comonomers. The weighting may be determined by the proportion of the amounts of the comonomers fed into the GPP reactor; alternatively by NMR spectroscopy on the (A) HSG-FP Copolymer to determine the relative amounts of the different comonomeric units in the (A) HSG-FP Copolymer when the respective hydrolyzable silyl groups are bonded to different types of carbon atoms (e.g., tertiary versus secondary carbon atoms); alternatively by Fourier Transform Infrared (FT-IR) spectroscopy calibrated to provide quantitation of the different types comonomers.

EXAMPLES

Alkenyl-functional hydrolyzable silane 1: vinyltrimethoxysilane (VTMS) available as XIAMETER™ OFS-6300 Silane from The Dow Chemical Company.

Polymer that is not (A) 1 (LLDPE (I)-1): a linear low-density polyethylene homopolymer having a density of 0.921 g/cm$^3$ and a melt index (I2) of 0.7 g/10 minutes. Available as DFDA-7530 NT LLDPE from The Dow Chemical Company, Midland, Michigan, USA.

Tert-butyl peroxyacetate PA; Luperox 7M75; Trigonox F-C50 from Arkema.

Moisture Scavenger (E)-1: octyltriethoxysilane (OTES) available as PROSIL™9202 from SiVance LLC, of Milliken & Co.

HSG-FP Copolymer Preparation Method. Into a stirred autoclave reactor having a capacity of 545 milliliters (mL), charge a mixture of ethylene, alkenyl-functional hydrolyzable silane (e.g., vinyltrimethoxysilane (VTMS)), and propylene, which is used as a chain transfer agent. Add organic peroxide (e.g., tert-butyl peroxyacetate 75 wt % solution in aliphatic hydrocarbons) at a loading of 0.2 wt % based on total weight of ethylene, alkenyl-functional hydrolyzable silane, optionally propylene, and organic peroxide. Pressurize the reactor to 193 MPa (28,000 to 28,100 pounds per square inch (psi)) and heat the reactor to 250° C. Continuously feed ethylene, alkenyl-functional hydrolyzable silane (e.g., vinyltrimethoxysilane (VTMS)), and optionally propylene into the reactor, and remove made (A) HSG-FP Copolymer from the reactor. Convert (A) into pellet form via melt extrusion.

Inventive HSG-FP Copolymer (A)-1: made according to the HSG-FP Preparation Method using VTMS as the alkenyl-functional hydrolyzable silane, tert-butyl peroxyacetate as the organic peroxide, and propylene under the effective process conditions shown in Table 1. Characterized by properties shown in Table 2.

Inventive HSG-FP Copolymer (A)-2: made according to the HSG-FP Preparation Method using VTMS as the alkenyl-functional hydrolyzable silane, tert-butyl peroxyacetate as the organic peroxide, and propylene under the effective process conditions shown in Table 1. Characterized by properties shown in Table 2.

Comparative HSG-FP Copolymer CE1: made according to the HSG-FP Preparation Method using VTMS as the alkenyl-functional hydrolyzable silane, tert-butyl peroxyacetate as the organic peroxide, and propylene under the effective process conditions shown in Table 1. Characterized by properties shown in Table 2.

TABLE 1 exemplified effective process conditions.

| | Ex. No. | | |
|---|---|---|---|
| | HSG-FP Copolymer CE1 | HSG-FP Copolymer (A)-1 | HSG-FP Copolymer (A)-2 |
| Reactor pressure (MPa) | 193.7 | 193.7 | 193.1 |
| Reactor Temperature (° C.) | 250.1 | 250.0 | 249.9 |
| Ethylene feed rate (kg/hour) | 11.4 | 11.4 | 11.4 |
| VTMS feed rate (kg/hour) | 0.077 | 0.141 | 0.196 |
| Propylene feed rate (kg/hour) | 0.20 | 0.15 | 0.12 |
| Tert-butyl peroxyacetate solution feed rate (mL/hour) | 31.88 | 29.96 | 29.38 |
| Ethylene conversion (%) | 11.5 | 10.8 | 13.8 |

TABLE 2 properties of (hydrolyzable silane group)-functional polyethylene copolymers.

| | Ex. No. | | |
|---|---|---|---|
| | HSG-FP Copolymer CE1 | HSG-FP Copolymer (A)-1 | HSG-FP Copolymer (A)-2 |
| Melt index (I$_2$) (g/10 min.) | 1.19 | 1.43 | 2.03 |
| Density | 0.9201 | 0.9214 | 0.9220 |
| Vinyl groups per 1,000 Carbon atoms (NMR) | 0.168 | 0.143 | 0.135 |
| Total Hydrolyzable silyl group content (wt %, by XRF) | 1.58 | 2.92 | 4.15 |
| Total Hydrolyzable silyl group content (mol %, calculated from wt %) | 0.30 | 0.57 | 0.81 |
| $M_{z(abs)}/M_{w(abs)}$ | 17.44 | 16.28 | 18.66 |
| $M_{w(conv)}/M_{n(conv)}$ | 6.51 | 6.84 | 6.66 |
| $((M_{z(abs)}/M_{w(abs)})/(M_{w(conv)}/M_{n(conv)}))$ | 2.68 | 2.38 | 2.80 |
| Crystallinity at Room Temperature (wt %) | 45.55 | 43.99 | 42.46 |

Comparative HSG-FP Copolymer CE2: an ethylene/VTMS copolymer having a (E) moisture scavenger and characterized by melt index (I$_2$) 1.5 g/10 minutes, density 0.922 g/cm$^3$, a nominal alkenyl-functional hydrolyzable silyl group (VTMS) comonomeric content by XRF of 1.5 wt % and 0.29 mol % total. Available from The Dow Chemical Company as SI-LINK™ AC DFDB-5451 NT. Crystallinity at room temperature is 46.24 wt %.

Comparative HSG-FP Copolymer CE3: an ethylene/VTMS copolymer characterized by melt index (I$_2$) 1.5 g/10 minutes, density 0.922 g/cm$^3$, an alkenyl-functional hydrolyzable silyl group (VTMS) comonomeric content by XRF of 1.44 wt % and 0.28 mol % total. Available from The Dow Chemical Company as SI-LINK™ DFDA-5451 NT. Crystallinity at room temperature is 46.87 wt %.

Catalyst Masterbatch Preparation Method (prophetic). Prepare catalyst masterbatch comprising (I) polymer as a carrier resin and (B) condensation cure catalyst using a 420 mL BRABENDER mixing bowl with cam rotors. Calculate a batch mass sufficient to fill 70% of the mixing bowl. Preheat the mixing bowl to a set temperature of 160° C. and set rotor speed to 25 rotations per minute (rpm). Add one half amount of carrier resin to the preheated bowl, and flux the carrier resin until it completely melts to give a melt thereof. Next, slowly add (B) condensation cure catalyst (e.g., DBTDL or a sulfonic acid), and incorporate (B) into the carrier resin melt. Then add any other carrier resin, if desired, and/or any additive(s) such as (C) antioxidant (e.g., bis(4-(1-methyl-1-phenylethyl)phenyl)amine; 2,2'-thiobis(2-t-butyl-5-methylphenol); 2,2'-thiobis(6-t-butyl-4-methylphenol); tris[(4-tert-butyl-3-hydroxy-2,6-dimethylphenyl)methyl]-1,3,5-triazine-2,4,6-trione; pentaerythritol tetrakis (3-(3,5-bis(1,1-dimethylethyl)-4-hydroxyphenyl) propionate; distearyl thiodipropionate ("DSTDP"); dilauryl thiodipropionate; or 2',3-bis[[3-[3,5-di-tert-butyl-4-hydroxyphenyl]propionyl]] propionohydrazide), (D) colorant (e.g., carbon black), and (F) UV stabilizer (e.g., hindered amine light stabilizer such as N,N'-bisformyl-N,N'-bis(2,2, 6,6-tetramethyl-4-piperidinyl)-hexamethylenediamine). A metal deactivator (e.g., oxalyl bis(benzylidene)hydrazide (OABH) may also be added. Then increase the rotor speed to 40 rpm. Allow the resulting catalyst masterbatch to flux for 5 minutes. Remove the catalyst masterbatch from the mixing bowl, and cold press it in a cold press for 5 minutes under a load of 0.689 to 1.38 MPa (100 to 200 pounds per square inch (psi)). Cut the resulting plaque into smaller pieces. Feed the pieces to a Brabender Prep Mixer/Measuring Head laboratory electric batch mixer equipped with 24:1 extruder. Use the 24:1 Maddox mixing head screw to melt carrier resin and convey the catalyst masterbatch through a stranded die at 40 rpm screw speed, using a 20/40/20/40/20 mesh screen pack and a flat set temperature profile of 160° C. across zone 1, zone 2, zone 3 and die. Mill the resulting strand extrudate in a Wiley mill to produce the catalyst masterbatch as pellets. If desired, soak (E) moisture scavenger (e.g., octyltriethoxysilane) into the pellets.

Catalyst Masterbatch 1: a blend of a thermoplastic ethylenic polymers, a phenolic compound, and about 3 wt % of (B) as an alkyl-substituted arylsulfonic acid.

Catalyst Masterbatch 2: a blend of thermoplastic ethylenic polymers, phenolic compounds, and about 2.6 wt % of (B) as dibutyltin dilaurate $(CH_3(CH_2)_3)_2Sn(O_2C(CH_2)_{10}CH_3)_2)$.

Catalyst Masterbatch 3: a blend of a thermoplastic ethylenic polymer, carbon black, a moisture scavenger (octyltriethoxysilane), an antioxidant, a stabilizer, and about 1.5 wt % of (B) as a naphthalene-based sulfonic acid.

Catalyst Masterbatch 4: blend of thermoplastic ethylenic polymer, antioxidant, carbon black, titanium dioxide, a stabilizer, and about 2.6 wt % of (B) as dibutyltin dilaurate.

Each thermoplastic ethylenic polymer (ethylene-based polymer) used in the Catalyst Masterbatches 1 to 4 independently has 51 to 100 wt % ethylenic monomeric units and from 49 to 0 wt % comonomeric units derived from a comonomer independently selected from 1-butene, 1-hexene, and ethyl acrylate. Each thermoplastic ethylenic polymer independently may be a polyethylene homopolymer, LDPE, LLDPE, an ethylene/1-butene copolymer, an ethylene/1-hexene copolymer, and an ethylene/ethyl acrylate (EEA) copolymer.

Moisture-curable polyethylene formulation Preparation Method: soak (E)-1 moisture scavenger octyltriethoxysilane, if used, into pellets of inventive HSG-FP Copolymer (A)-1, inventive HSG-FP Copolymer (A)-2, comparative HSG-FP Copolymer CE1, comparative HSG-FP Copolymer CE2, or comparative HSG-FP Copolymer CE3 in a glass jar at 23° C., and tumble blend for 10 minutes. Then heat the jar and its contents in an oven at 70° C. for 30 minutes, remove the jar and tumble blend its contents for 10 minutes. Store the resulting pellets at 23° C. until ready for use within 5 days. Tumble blend the stored pellets at 23° C. for 10 minutes immediately prior to use, then physically blend the pellets in a plastic bag with pellets of any one of Catalyst Masterbatches 1 to 4 to give comparative formulations A to F (CE-A to CE-F) shown in Table 3 later and inventive formulations IE-A to IE-E as shown in Table 4 later and inventive formulations IE-F to IE-H as shown in Table 5 later.

Tape Preparation Method: Used to prepare the moisture-curable polyethylene formulation in the form of a tape for ambient curing and hot creep testing evaluations. Feed the formulations prepared according to the above method into a Brabender 1.905 cm (¾ inch) extruder equipped with a 25:1 double mixing zone (pineapple) screw, a 40/60/40 mesh screen pack, and a 5.08 cm (2 inches) width head die. The extruder has a temperature profile across four zones of 150° C., 160° C., 170° C., and 170° C. at the head die and a screw speed of 60 rotations per minute (rpm). This makes different ones of formulation in the form of a tape having an average thickness of from 1.37 to 1.70 mm (54 to 67 mils).

Ambient Moisture Curing Method. For characterization and comparison, the ambient curing conditions were controlled as follows. Cure the tape specimens made by the Tape Preparation Method in a 23° C.±2° C. and 50%±2% RH environment for up to 182 days as indicated in Tables 3 to 5 later to make cured polymer products. Measure hot creep of the cured polymer products according to the Hot Creep Test Method.

Hot Water Curing Method. Immerse the tape specimens made by the Tape Preparation Method for 20 hours in a 90° C.±2° C. water bath as indicated in Tables 3 to 5 later to make cured polymer products. Measure hot creep of the cured polymer products according to the Hot Creep Test Method.

Hot Creep Test Method. Measures extent of crosslinking, and thus extent of curing, in test samples of the cured polymer products prepared by the Moisture Curing Method. Testing is based on the Insulated Cable Engineers Association (ICEA) standard for power cable insulation materials, ICEA-T-28-562-2003. Specimens are taken out along the extrusion direction from tapes having thickness value ranging from 0.762 to 2.032 mm (30 to 80 mils). Subject test samples to Hot Creep Test Method under a load, Wt, and at 200° C., according to UL 2556, *Wire and Cable Test Methods*, Section 7.9. Load Wt=CA*200 kilopascals (kPa, 29.0 pound-feet per square inch), wherein CA is the cross-sectional area of a dog bone sample cut from a tape specimen prepared according to the Tape Preparation Method. Prepare three dog bone specimens per test material. Make two marks on the specimen at an original distance G apart from each other, wherein G=25+/−2 mm. Place in upper grip of hot creep test assembly. Hang load 0.2 megapascals (MPa) from gripped specimen. Heat the test assembly with dog bone specimen in a preheated circulating air oven at 200° C.+/−2° C. for 15 minutes, and then with the load still attached measure the specimen's final length $D_e$ between the marks. Calculate hot creep elongation percent (HCE) according to equation 1: $HCE=[100*(D_e-G)]/G$ (1). The amount of extension divided by initial length provides a measure of hot creep as a percentage. The lower the hot creep percent, the lower the extent of elongation of a test sample under load, and thus the greater the extent of crosslinking, and thus the greater the extent of curing. A lower hot creep value suggests a higher crosslink degree. The hot creep measurement of samples cured immersed in a 90° C.±2° C. water bath for 20 hours indicates an ultimate extent of crosslinking in the cured product. The greater the ultimate extent of crosslinking in the cured polymer product, the greater the amounts of non-crosslinkable polymer or non-moisture curable (e.g., peroxide and/or light curable only) polymer (e.g., other than HSG-FP Copolymer (e.g., polyethylene) that may be incorporated into the moisture-curable polyethylene formulation while the cured polymer product still achieves satisfactory hot creep performance of less than or equal to 175% after curing.

The hot creep performance of comparative formulations A to F (CE-A to CE-F) is shown in Table 3. The hot creep performance of inventive formulations IE-A to IE-E is shown in Table 4. The hot creep performance of inventive formulations IE-F to IE-H is shown in Table 5. Percent hot creep of the comparative examples is measured after ambient curing beginning at 2, 3, and/or 4 days, and then again after 7 days, 10 days, 14 days, 21 days, 28 days, and 35 days. Percent hot creep of the inventive examples is measured after ambient curing beginning at 1, 2, 3, and/or 4 days, and then again after 7 days, 10 days, 14 days, 21 days, 28 days, 35 days, 70 days, 114 days, and 182 days (70, 114, and 182 days were done for CE-E only). These % hot creep values measured at various time intervals are available upon request. For each example, the number of days needed to attain 100% or 80% hot creep is determined by the reading off or interpolating values from plots of % hot creep versus days of ambient curing.

TABLE 3

Comparative formulations (wt %); hot creep performance after curing for a number (no.) of days at 23° C., 50% RH: CE-A to CE-E.

| Ex. No. | CE-A | CE-B | CE-C | CE-D | CE-E |
|---|---|---|---|---|---|
| HSG-FP Copolymer CE1 | 94.5 | 0 | 92.0 | 0 | 46.0 |
| HSG-FP Copolymer CE2 | 0 | 95.0 | 0 | 0 | 0 |
| HSG-FP Copolymer CE3 | 0 | 0 | 0 | 92.0 | 0 |
| Moisture scavenger (E)-1 (OTES) | 0.5 | 0 | 0 | 0 | 0 |
| LLDPE (I)-1 | 0 | 0 | 0 | 0 | 46.0 |
| Catalyst Masterbatch 1 | 5.0 | 5.0 | 0 | 0 | 0 |
| Catalyst Masterbatch 2 | 0 | 0 | 0 | 0 | 0 |
| Catalyst Masterbatch 3 | 0 | 0 | 8.0 | 8.0 | 8.0 |
| Catalyst Masterbatch 4 | 0 | 0 | 0 | 0 | 0 |
| Total | 100 | 100 | 100 | 100 | 100 |
| (B) catalyst (delivered in Catalyst Masterbatch) | Sulfonic acid | Sulfonic acid | Sulfonic acid | Sulfonic acid | Sulfonic acid |
| Total wt % of (B) catalyst in formulation (delivered via Catalyst Masterbatch) | 0.14 | 0.14 | 0.12 | 0.12 | 0.12 |
| Tape thickness (mm) | 1.52 | 1.58 | 1.47 | 1.47 | 1.60 |
| No. Days curing in air at 23° C./50% RH to attain 100% Hot Creep (200° C., 0.2 MPa) | 3.3 | 3.7 | 17 | 7 | >182 |
| No. Days curing in air at 23° C./50% RH to attain 80% Hot Creep (200° C., 0.2 MPa) | 4.5 | 4.6 | 25 | 14 | >182 |
| % Hot Creep (200° C., 0.2 MPa) after curing in water bath at 90° C. for 20 hours | 21.9 | 19.5 | 22.6 | 22.6 | 79.7 |

Hot creep measurement made with CE-E after 182 days at 23' C./50% RH was 142% (i.e., had not yet reached the target of 100% or less, alternatively 80% or less).

TABLE 4

Inventive formulations (wt %) and hot creep performance after curing for a number of days at 23° C., 50% RH: IE-A to IE-E.

| Ex. No. | IE-A | IE-B | IE-C | IE-D | IE-E |
|---|---|---|---|---|---|
| HSG-FP Copolymer (A)-1 IE1 | 0 | 0 | 0 | 0 | 0 |

TABLE 4-continued

Inventive formulations (wt %) and hot creep performance after curing for a number of days at 23° C., 50% RH: IE-A to IE-E.

| Ex. No. | IE-A | IE-B | IE-C | IE-D | IE-E |
|---|---|---|---|---|---|
| HSG-FP Copolymer (A)-2 IE2 | 94.5 | 94.5 | 89.5 | 94.5 | 89.5 |
| Moisture scavenger (E)-1 (OTES) | 0.5 | 0.5 | 0.5 | 0.5 | 0.5 |
| LLDPE (I)-1 | 0 | 0 | 0 | 0 | 0 |
| Catalyst Masterbatch 1 | 5.0 | 0 | 0 | 0 | 0 |
| Catalyst Masterbatch 2 | 0 | 5.0 | 10.0 | 0 | 0 |
| Catalyst Masterbatch 3 | 0 | 0 | 0 | 0 | 0 |
| Catalyst Masterbatch 4 | 0 | 0 | 0 | 5.0 | 10.0 |
| Total | 100 | 100 | 100 | 100 | 100 |
| (B) catalyst (delivered in Catalyst Masterbatch) | Sulfonic acid | DBTDL | DBTDL | DBTDL | DBTDL |
| Total wt % of (B) catalyst in formulation (delivered via Catalyst Masterbatch) | 0.14 | 0.13 | 0.26 | 0.13 | 0.26 |
| Tape thickness (mm) | 1.52 | 1.55 | 1.58 | 1.60 | 1.60 |
| No. Days curing in air at 23° C./50% RH to attain 100% Hot Creep (200° C., 0.2 MPa) | 0.4 | 3.3 | 2.4 | 1.9 | 0.9 |
| No. Days curing in air at 23° C./50% RH to attain 80% Hot Creep (200° C., 0.2 MPa) | 0.7 | 4.3 | 2.9 | 2.4 | 1.4 |
| % Hot Creep (200° C., 0.2 MPa) after curing in water bath at 90° C. for 20 hours | 7.7 | 12.1 | 11.6 | 11.0 | 8.4 |

TABLE 5

Inventive formulations (wt %) and hot creep performance after curing for a number of days at 23° C., 50% RH: IE-F to IE-H.

| Ex. No. | IE-F | IE-G | IE-H |
|---|---|---|---|
| HSG-FP Copolymer (A)-1 IE1 | 92.0 | 0 | 0 |
| HSG-FP Copolymer (A)-2 IE2 | 0 | 92.0 | 46.0 |
| Moisture scavenger (E)-1 (OTES) | 0 | 0 | 0 |
| LLDPE (I)-1 | 0 | 0 | 46.0 |
| Catalyst Masterbatch 1 | 0 | 0 | 0 |
| Catalyst Masterbatch 2 | 0 | 0 | 0 |
| Catalyst Masterbatch 3 | 8.0 | 8.0 | 8.0 |
| Catalyst Masterbatch 4 | 0 | 0 | 0 |
| Total | 100 | 100 | 100 |
| (B) catalyst (delivered in Catalyst Masterbatch) | Sulfonic acid | Sulfonic acid | Sulfonic acid |
| Total wt % of (B) catalyst in formulation (delivered via Catalyst Masterbatch) | 0.12 | 0.12 | 0.12 |
| Tape thickness (mm) | 1.37 | 1.42 | 1.55 |
| No. Days curing in air at 23° C./50% RH to attain 100% Hot Creep (200° C., 0.2 MPa) | 3 | 2 | 7 |
| No. Days curing in air at 23° C./50% RH to attain 80% Hot Creep (200° C., 0.2 MPa) | 4 | 3 | 9 |
| % Hot Creep (200° C., 0.2 MPa) after curing in water bath at 90° C. for 20 hours | 17.0 | 13.1 | 23.5 |

As shown by comparing the comparative example data in Table 2 to the inventive example data in Tables 3 and 4, the inventive formulations produced inventive cured products with substantially faster crosslinking in air at 230° C., 5000 RH and/or greater extent of crosslinking as indicated by the shorter time needed to achieve hot creep less than or equal to 1000% or 8000, as well as the hot creep measurements less than 190%, alternatively less than 17.5% after 20 hours in a 90° C. water bath when the formulation is without 46 wt % LLDPE; and also hot creep measurements less than 500% when the formulation contains 46 wt % LLDPE. The faster cure in air at 23' C., 50% RH and a greater ultimate extent of crosslinking in a hot water bath at 90° C. is achieved by the combination of enabling features of the HSG-FP Copolymer and enabling features of the formulation.

The lower the Hot Creep %, the greater the extent of crosslinking. The greater the extent of crosslinking, the more suitable the cured polymer product is for use as a coating layer on a cable such as a power cable, including embodiments wherein the coating layer is cured under the ambient conditions. Reducing hot creep to a value less than 175% indicates sufficient extent of crosslinking for use of the resulting cured polymer product as a coating layer of a cable. The faster hot creep of 175% is attained under ambient conditions, the higher the throughput of a manufacturing operation using the moisture-curable polyethylene formulation to make a coating layer on the cable.

The invention claimed is:

1. A moisture-curable polyethylene formulation comprising from 15 to 99.99 weight percent (wt %) of (A) a (hydrolyzable silyl group)-functional polyethylene copolymer (HSG-FP Copolymer); from 0.01 to 5 wt % of (B) a condensation cure catalyst; and from 0 to 84.99 wt % of one or more optional additives; with the proviso that when (B) is only a dialkyltin dicarboxylate, the dialkyltin dicarboxylate is at least 0.10 wt % and the (A) HSG-FP Copolymer is at most 99.90 wt % of the moisture-curable polyethylene formulation; wherein all wt % are based on total weight and add to 100.00 wt % of the moisture-curable polyethylene formulation; and wherein the (A) HSG-FP Copolymer is made by copolymerizing ethylene, at least one alkenyl-functional hydrolyzable silane, optionally propylene, the copolymerizing being done under effective process conditions in a high-pressure-and-temperature (HPT) reactor free of a metal-containing olefin polymerization catalyst and containing an organic peroxide and the copolymerizing is free of an optional olefinic comonomer selected from an olefinically-unsaturated carboxylic acid, an olefinically-unsaturated carboxylic ester, an olefinically-unsaturated carboxylic anhydride, and combinations thereof and, optionally, a chain transfer agent (CTA) that is not propylene or a $(C_4-C_{20})$alpha-olefin; and wherein the (A) HSG-FP Copolymer is characterized by a total hydrolyzable silyl group content from 0.38 to 0.99 mole percent (mol %) and a molecular mass dispersity of any one of limitations (i) to (iii): (i) a ratio of absolute z-average molecular weight to absolute weight-average molecular weight ($M_{z(abs)}/M_{w(abs)}$ or absolute molecular mass dispersity) of 9.51 or greater; (ii) a ratio of absolute molecular mass dispersity to conventional molecular mass dispersity (($M_{z(abs)}/M_{w(abs)}$)/($M_{w(conv)}/M_{n(conv)}$) of 1.51 or greater, wherein $M_{w(conv)}$ is conventional weight-average molecular weight and $M_{n(conv)}$ is conventional number-average molecular weight; and (iii) both (i) and (ii); wherein the (B) condensation cure catalyst comprises a dialkyltin dicarboxylate or a sulfonic acid of formula $RSO_3H$ wherein R is $(C_1-C_{10})$alkyl, $(C_6-C_{10})$aryl, a $(C_1-C_{10})$alkylsubstituted $(C_6-C_{10})$aryl, or a $(C_6-C_{10})$aryl-substituted $(C_1-C_{10})$alkyl.

2. The moisture-curable polyethylene formulation of claim 1 characterized by any one of limitations (i) to (xii): (i) the HPT reactor and process of making the (A) HSG-FP Copolymer is free of propylene and the (A) HSG-FP Copolymer is free of propylenic units derived from propylene, (ii) the HPT reactor and process of making the (A) HSG-FP Copolymer comprises from greater than 0 wt % to at most 2 wt % of propylene, based on total mass flow rates of ethylene, at least one alkenyl-functional hydrolyzable silane, and propylene into the HPT reactor and the (A) HSG-FP Copolymer comprises from >0 wt % to at most 2 wt % of propylenic units derived from propylene, (iii) the HPT reactor and process of making the (A) HSG-FP Copolymer is free of $(C_4-C_{20})$alpha-olefin and the (A) HSG-FP Copolymer is free of units derived from the $(C_4-C_{20})$alpha-olefin, (iv) the HPT reactor and process of making the (A) HSG-FP Copolymer comprises from >0 wt % to at most 20 wt % of $(C_4-C_{20})$alpha-olefin, based on total mass flow rates of ethylene, at least one alkenyl-functional hydrolyzable silane, and $(C_4-C_{20})$alpha-olefin and the (A) HSG-FP Copolymer comprises from >0 wt % to at most 20 wt % comonomeric units derived from the $(C_4-C_{20})$alpha-olefin, (v) both (i) and (iii), (vi) both (i) and (iv), (vii) both (ii) and (iii), (viii) both (ii) and (iv), (ix) the (A) HSG-FP Copolymer is free of grafted hydrolyzable silyl groups and the moisture-curable polyethylene formulation is free of alkenyl-functional hydrolyzable silane, (x) both (ix) and any one of limitations (i) to (viii), (xi) the effective process conditions comprise a reactor temperature from 175° to 400.0° C. and a reactor pressure from 34.5 to 344.7 megapascals, or (xii) both (xi) and any one of limitations (i) to (x).

3. The moisture-curable polyethylene formulation of claim 1, wherein the total hydrolyzable silyl group content of the (A) HSG-FP Copolymer is from 0.43 to 0.99 mol %.

4. The moisture-curable polyethylene formulation of claim 1, wherein the molecular mass dispersity of the (A) HSG-FP Copolymer is characterized by any one of limitations (i) to (iv): (i) a ratio of $M_{z(abs)}/M_{w(abs)}$ of 10.5 to 21.0; (ii) a ratio of ($M_{z(abs)}/M_{w(abs)}$)/($M_{w(conv)}/M_{n(conv)}$) of 1.9 to 3.4; (iii) both (i) and (ii); (iv) a ratio of $M_{z(abs)}/M_{w(abs)}$ of 16.2 to 18.9 and a ratio of ($M_{z(abs)}/M_{w(abs)}$)/($M_{w(conv)}/M_{n(conv)}$) of 2.3 to 3.1.

5. The moisture-curable polyethylene formulation of claim 1, wherein each hydrolyzable silyl group of the (A) HSG-FP Copolymer is independently a monovalent group of formula $(R^2)_m(R^3)_{3-m}Si-$, wherein subscript m is an integer of 1, 2, or 3; each $R^2$ is independently H, HO—, $(C_1-C_8)$alkoxy, $(C_2-C_6)$carboxy, phenoxy, $(C_1-C_6)$alkyl-phenoxy, $(C_1-C_6)$alkyl(H)N—, $((C_1-C_6)$alkyl$)_2$N—, $(C_1-C_6)$alkyl(H)C=NO—, or $((C_1-C_6)$alkyl$)_2$C=NO—; and each $R^3$ is independently $(C_1-C_8)$alkyl or phenyl.

6. The moisture-curable polyethylene formulation of claim 1 comprising a total of from >0 wt % to 84.99 wt % of the one or more optional additives, wherein the additive(s) is/are selected from additives (C) to (I): (C) an antioxidant; (D) a colorant; (E) a moisture scavenger; (F) a stabilizer for stabilizing the formulation against effects of ultraviolet light (UV stabilizer), such as a hindered amine light stabilizer (HALS); (G) a processing aid; (H) a flame retardant; (I) a polymer that is not (A); and a combination of any two or more of (C) to (I).

* * * * *